United States Patent
Park et al.

(10) Patent No.: US 10,832,670 B2
(45) Date of Patent: Nov. 10, 2020

(54) VOICE INPUT PROCESSING METHOD AND ELECTRONIC DEVICE FOR SUPPORTING THE SAME

(71) Applicant: Samsung Electronics Co., Ltd., Gyeonggi-do (KR)

(72) Inventors: No Joon Park, Gyeonggi-do (KR); Hyo Jung Lee, Gyeonggi-do (KR); Jun Hyung Park, Seoul (KR); Tae Hee Lee, Gyeonggi-do (KR); Geon Soo Kim, Gyeonggi-do (KR); Han Jib Kim, Gyeonggi-do (KR); Yong Joon Jeon, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 247 days.

(21) Appl. No.: 15/869,749

(22) Filed: Jan. 12, 2018

(65) Prior Publication Data
US 2018/0211665 A1 Jul. 26, 2018

(30) Foreign Application Priority Data
Jan. 20, 2017 (KR) .................. 10-2017-0009635

(51) Int. Cl.
*G10L 15/00* (2013.01)
*G10L 15/26* (2006.01)
(Continued)

(52) U.S. Cl.
CPC ............ *G10L 15/22* (2013.01); *G06F 1/3231* (2013.01); *G06F 3/167* (2013.01); *G10L 15/083* (2013.01);
(Continued)

(58) Field of Classification Search
CPC ... G10L 15/22; G10L 2015/223; G10L 17/22; G10L 15/00; G10L 15/26;
(Continued)

(56) References Cited

U.S. PATENT DOCUMENTS 8,068,881 B2  11/2011  Schrager
8,340,975 B1* 12/2012  Rosenberger ........... G10L 15/22
                                                        704/270
(Continued)

FOREIGN PATENT DOCUMENTS

JP        2016-114744 A      6/2016

OTHER PUBLICATIONS

International Search Report dated May 8, 2018.

*Primary Examiner* — Olujimi A Adesanya
(74) *Attorney, Agent, or Firm* — Cha & Reiter, LLC.

(57) ABSTRACT

An electronic device is provided. The electronic device includes a microphone, a communication circuitry, an indicator configured to provide at least one visual indication, and a processor configured to be electrically connected with the microphone, the communication circuitry, and the indicator, and a memory. The memory stores instructions, when executed, cause the processor to receive a first voice input through the microphone, perform a first voice recognition for the first voice input, if a first specified word for waking up the electronic device is included in a result of the first voice recognition, display a first visual indication through the indicator, receive a second voice input through the microphone, perform a second voice recognition for the second voice input, and if a second specified word corresponding to the first visual indication is included in a result of the second voice recognition, wake up the electronic device.

15 Claims, 20 Drawing Sheets

(51) Int. Cl.
*G10L 25/00* (2013.01)
*G10L 21/00* (2013.01)
*G10L 15/22* (2006.01)
*G06F 3/16* (2006.01)
*G10L 15/08* (2006.01)
*G06F 1/3231* (2019.01)
*G10L 15/32* (2013.01)
*G10L 17/22* (2013.01)

(52) U.S. Cl.
CPC ............ *G10L 15/26* (2013.01); *G10L 15/32* (2013.01); *G10L 17/22* (2013.01); *G10L 2015/088* (2013.01); *G10L 2015/223* (2013.01)

(58) Field of Classification Search
CPC ... G10L 2015/225; G10L 15/30; G10L 15/32; G06F 3/167; G06F 21/32; G06F 1/3231
See application file for complete search history.

(56) References Cited

U.S. PATENT DOCUMENTS

| | | | |
|---|---|---|---|
| 8,620,389 B2 | 12/2013 | Schrager | |
| 9,047,857 B1* | 6/2015 | Barton | G10L 15/22 |
| 9,293,138 B2 | 3/2016 | Torok et al. | |
| 9,361,885 B2* | 6/2016 | Ganong, III | G10L 15/22 |
| 9,424,841 B2 | 8/2016 | Foerster et al. | |
| 9,431,017 B2 | 8/2016 | Kojima et al. | |
| 9,466,286 B1* | 10/2016 | Hart | G10L 15/10 |
| 9,548,053 B1* | 1/2017 | Basye | G06F 16/683 |
| 9,721,587 B2 | 8/2017 | Klein et al. | |
| 9,747,903 B2 | 8/2017 | Kojima et al. | |
| 9,779,757 B1* | 10/2017 | Blanksteen | G10L 21/10 |
| 9,786,294 B1* | 10/2017 | Bezos | G06F 3/167 |
| 9,990,922 B2 | 6/2018 | Foerster et al. | |
| 10,147,441 B1* | 12/2018 | Pogue | H04R 3/005 |
| 10,461,712 B1* | 10/2019 | Yang | H03G 3/3005 |
| 10,515,653 B1* | 12/2019 | Pogue | H04R 27/00 |
| 2006/0252457 A1 | 11/2006 | Schrager | |
| 2012/0065971 A1 | 3/2012 | Schrager | |
| 2013/0238326 A1 | 9/2013 | Kim et al. | |
| 2014/0207452 A1 | 7/2014 | Klein et al. | |
| 2014/0222436 A1* | 8/2014 | Binder | G10L 15/265 |
| | | | 704/275 |
| 2014/0343946 A1 | 11/2014 | Torok et al. | |
| 2014/0376747 A1* | 12/2014 | Mullet | G08C 23/00 |
| | | | 381/110 |
| 2015/0046157 A1 | 2/2015 | Wolff et al. | |
| 2015/0088518 A1 | 3/2015 | Kim et al. | |
| 2015/0228274 A1 | 8/2015 | Leppanen et al. | |
| 2015/0287411 A1 | 10/2015 | Kojima et al. | |
| 2015/0331490 A1 | 11/2015 | Yamada | |
| 2016/0104483 A1 | 4/2016 | Foerster et al. | |
| 2016/0300571 A1 | 10/2016 | Foerster et al. | |
| 2016/0323972 A1* | 11/2016 | Bora | H05B 33/0842 |
| 2016/0329054 A1 | 11/2016 | Kojima et al. | |
| 2017/0025124 A1* | 1/2017 | Mixter | G10L 15/32 |
| 2017/0213554 A1* | 7/2017 | Faaborg | G10L 25/78 |
| 2017/0256270 A1* | 9/2017 | Singaraju | G10L 25/84 |
| 2017/0323646 A1 | 11/2017 | Kojima et al. | |
| 2017/0330429 A1* | 11/2017 | Tak | G06F 3/167 |
| 2018/0158461 A1 | 6/2018 | Wolff et al. | |
| 2018/0177029 A1* | 6/2018 | Wang | H05B 47/12 |
| 2019/0019509 A1* | 1/2019 | Lee | G06F 3/167 |
| 2019/0069058 A1* | 2/2019 | Lemons | G06F 3/167 |
| 2019/0103108 A1* | 4/2019 | Song | G06F 3/167 |
| 2020/0051554 A1* | 2/2020 | Kim | G10L 15/22 |

\* cited by examiner

VOICE INPUT PROCESSING METHOD AND ELECTRONIC DEVICE FOR SUPPORTING THE SAME

CLAIM OF PRIORITY

This application claims the benefit under 35 U.S.C. § 119(a) of a Korean patent application filed on Jan. 20, 2017 in the Korean Intellectual Property Office and assigned Ser. No. 10-2017-0009635, the entire disclosure of which is hereby incorporated by reference.

TECHNICAL FIELD

The present disclosure generally relates to a voice input processing method and an electronic device for supporting the same.

BACKGROUND

Recently, electronic devices have been developed to include a microphone and provide a voice interface, so that the devices may perform functions such as purchasing products or operating smart home systems via voice input received through the microphone. In doing so, the electronic device may perform voice recognition for the received voice input. If a specified word (e.g., a wake-up word) for waking up the electronic device is included in the result of the voice recognition, the electronic device may wake up itself or a module associated with performing a specified function.

SUMMARY

However, if there are a plurality of electronic devices which are woken up by the same specified word (e.g., "Hi, Galaxy") and are located within a predetermined distance (e.g., about 20 m), when the user speaks the specified word, the plurality of electronic devices may be woken up irrespective of intention of the user.

If the plurality of electronic devices are woken up by the same specified word, the user may unnecessarily receive the same response from multiple devices or may receive error information (e.g., a voice, a screen indication, or the like) regarding the voice recognition from some devices.

Aspects of the present disclosure are to address at least the above-mentioned problems and/or disadvantages and to provide at least the advantages described below. Accordingly, an aspect of the present disclosure is to provide a voice input processing method for waking up one of a plurality of electronic devices if there are the plurality of electronic devices which are woken up by the same specified word. The electronic device for supporting the same is also described.

In accordance with an aspect of the present disclosure, an electronic device includes a microphone configured to receive a voice input, a communication circuitry configured to communicate with an external electronic device, an indicator configured to provide at least one visual indication, and a processor configured to be electrically connected with the microphone, the communication circuitry, and the indicator, and a memory configured to be electrically connected with the processor. The memory stores instructions, when executed, cause the processor to receive a first voice input through the microphone, perform a first voice recognition for the first voice input, if a first specified word for waking up the electronic device is included in a result of the first voice recognition, display a first visual indication through the indicator, receive a second voice input through the microphone, perform a second voice recognition for the second voice input, and if a second specified word corresponding to the first visual indication is included in a result of the second voice recognition, wake up the electronic device.

In accordance with another aspect of the present disclosure, a voice input processing method of an electronic device includes receiving a first voice input through a microphone, performing a first voice recognition for the first voice input, if a first specified word for waking up the electronic device is included in a result of the first voice recognition, displaying an indication through the indicator, receiving a second voice input through the microphone, performing a second voice recognition for the second voice input, and if a second specified word corresponding to the indication is included in a result of the second voice recognition, waking up the electronic device.

In accordance with another aspect of the present disclosure, an electronic device includes a housing, a user interface configured to be exposed through the housing and to provide a visual indication, a first microphone, a speaker, a communication circuitry, a processor configured to be electronically connected with the user interface, the first microphone, the speaker, and the communication circuitry, and a memory configured to be electrically connected with the processor. The memory stores instructions, when executed, cause the processor to receive a first user voice input for waking up the electronic device through the first microphone, determine whether the electronic device is in a state for performing a selected operation based at least in part on the first user voice input, if the electronic device is in the state for performing the operation, provide a first indication using the user interface, receive a user input for selecting the electronic device to perform the operation, receive a second user voice input associated with the operation through the first microphone, transmit data associated with the operation to an external server through the communication circuitry, receive a response from the external server via the communication circuitry, and provide the response using at least one of the user interface and the speaker, and if the electronic device is not in the state for performing the operation, provide a second indication different from the first indication using the user interface and set the electronic device to a waiting state.

According to embodiments disclosed in the present disclosure, as a plurality of electronic devices which are woken up by the same specified word display different indications, only the electronic device a user wants may be woken up.

According to embodiments disclosed in the present disclosure, the plurality of electronic devices may provide a method for determining intention of the user (e.g., a method for selecting one electronic device to provide a response).

In addition, various effects or advantages directly or indirectly ascertained through the present disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
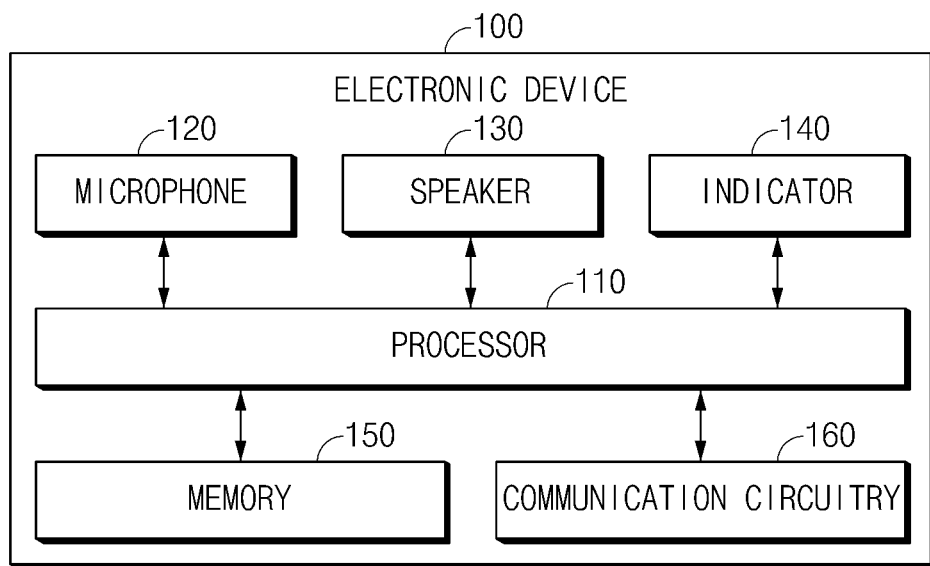
FIG. 1 is a block diagram illustrating an electronic device that processes voice inputs according to an embodiment.

Hereinafter, various embodiments of the present disclosure are disclosed with reference to the accompanying drawings. However, the present disclosure is not intended to be limited by the various embodiments of the present disclosure. Instead, it is intended that the present disclosure covers all modifications, equivalents, and/or alternatives provided they come within the scope of the appended claims and their equivalents.

The terms and words used in the following description and claims are not limited to their dictionary meanings, but, are merely used by the inventor(s) to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may refer to modifying various different elements of various embodiments of the present disclosure, but are not intended to limit the elements. For instance, "a first user device" and "a second user device" may indicate different users regardless of order or importance. For example, a first component may be referred to as a second component and vice versa without departing from the scope and spirit of the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it is intended that when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

Terms used in various embodiments of the present disclosure are used to describe certain embodiments of the present disclosure, but are not intended to limit the scope of other embodiments. All terms used herein may have the same meanings that are generally understood by a person skilled in the art. In any case, even the terms explicitly defined in the present specification are not intended to be interpreted as excluding embodiments of the present disclosure.

An electronic device according to various embodiments of the present disclosure may be a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, a wearable device, etc. The wearable device may be an accessory-type device (e.g., a watch, a ring, a bracelet, an anklet, a necklace, glasses, a contact lens, a head-mounted device (HIVID)), a textile- or clothing-integrated-type device (e.g., an electronic apparel), a body-attached-type device (e.g., a skin pad or a tattoo), or a bio-implantable-type device (e.g., an implantable circuit)

In another embodiment, the electronic device may be a home appliance. The smart home appliance may be a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ or PlayStation™), an electronic dictionary, an electronic key, a camcorder, an electronic picture frame, etc.

In another embodiment, the electronic device may be various medical devices (e.g., various portable medical measurement devices (e.g., a blood glucose measuring device, a heart rate measuring device, a blood pressure measuring device, a body temperature measuring device, or the like), a magnetic resonance angiography (MRA) device, a magnetic resonance imaging (MRI) device, a computed tomography (CT) device, a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

In yet another embodiment, the electronic device may be at least one of a part of furniture or a building/structure, an electronic board, an electronic signature receiving device, a projector, or a measuring instrument (e.g., a water meter, an electricity meter, a gas meter, a wave meter, or the like). The electronic device may be one or more combinations of the above-mentioned devices. The electronic device according to some various embodiments of the present disclosure may be a flexible device. The electronic device according to an embodiment of the present disclosure is not limited to the above-mentioned devices, and may include new electronic devices as new technology is developed.

Hereinafter, the electronic devices according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

FIG. 1 is a block diagram illustrating an electronic device that processes voice inputs according to an embodiment.

The electronic device 100 may perform voice recognition for a voice input received through a microphone 120. If a first specified word (e.g., a first wake-up word) for waking up the electronic device 100 is included in the result of the voice recognition, the electronic device 100 may wake up itself or at least one module associated with performing a function included in the electronic device 100. Meanwhile, if there is another external electronic device which can be woken up by the first wake-up word, the electronic device 100 may provide an indication to the user that is different from the indication provided in the external electronic device. This way, both the electronic device 100 and the external electronic device are not woken up simultaneously when the first specified word is spoken. Thus, using the indication provided by the electronic device 100, the user may verify that the electronic device 100, which the user wants to wake up, has not woken up. The user may then speak a second specified word (e.g., a second wake-up word) corresponding to the indication provided from the electronic device 100 to wake up the electronic device 100.

Referring to FIG. 1, the electronic device 100 for performing the above-mentioned function may include a processor 110, the microphone 120, a speaker 130, an indicator 140 (or a user interface), a memory 150, and a communication circuitry 160. The elements of the electronic device 100 are not limited thereto. According to various embodiments, the electronic device 100 may fail to include at least one of the above-mentioned elements and may further include at least one other element. According to an embodiment, the electronic device 100 may further include a proximity sensor which measures a proximity state and/or distance of an object (e.g. the user). Further, at least one of the above-mentioned elements may be located and fixed within a housing. The housing may include a front surface, a rear surface, and a side surface which surrounds at least part of a space between the front surface and the rear surface.

The processor 110 may execute arithmetic operations or data processing to control at least one other element of the electronic device 100. The processor 110 may drive, for example, an operating system (OS) or an application program to control a plurality of hardware or software elements of the electronic device 100. The processor 110 may include one or more of a central processing unit (CPU), an application processor (AP), or a communication processor (CP). According to an embodiment, the processor 110 may be implemented as a system on chip (SoC). The processor 110 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The processor 110 may analyze a voice input received through the microphone 120. According to an embodiment, the processor 110 may perform voice recognition for the received voice input. The processor 110 may analyze voice data corresponding to a voice input received through the microphone 120 and may convert the voice data into text. For example, if a user speaks the word "HI", the microphone 120 may convert vibration energy from the user's voice into an electronic signal and may transmit the converted electric signal to the processor 110. The processor 110 may convert the transmitted electric signal into frequency spectrum information and may compare the converted frequency spectrum information with a plurality of frequency spectrum information corresponding to various characters stored in the memory 150 to determine that characters (e.g., "H" and "I") were spoken.

According to an embodiment, the processor 110 may perform voiceprint identification for a received voice input. The processor 110 may perform voiceprint identification in substantially the same manner as voice recognition. Herein, in case of the voiceprint identification, the processor 110 may use the frequency spectrum information converted from the user's voice input. For example, if the user speaks the word "HI", voice recognition may only determine that characters (e.g., "H" and "I") were included in the input, whereas voiceprint identification may determine that a specific user spoke "HI."

According to an embodiment, if specified word or words are included in the result of the voice recognition, the processor 110 may wake up at least one other element included in the electronic device 100. For example, the processor 110 may supply power to one or more hardware elements and/or may load a software element (e.g., a program module) into the memory 150 so that the software element can be executed.

According to an embodiment, the processor 110 may determine whether there are one or more external electronic devices which also can be woken up by the specified word. For example, if a signal corresponding to the specified word is received from the external electronic device, the processor 110 may determine that the external electronic device is able to be woken up by the specified word. The signal corresponding to the wake-up word may be a signal transmitted from the external electronic device and may include, for example, a notification that the external electronic device recognizes the specified word and is in a state of waiting for wake-up. In this case, the processor 110 may not wake up elements in the electronic device 100 may provide (e.g. display) an indication through the indicator 140. For example, the processor 110 may provide an indication that is different from the indication provided from the external electronic device such that the user can distinguish the electronic device 100 from the external electronic device. The indication may be, for example, a color displayed by the indicator 140. For example, if the external electronic device displays a red color, the electronic device 100 may display another color, for example, blue or green. In some embodiments, if the indicator 140 includes a display, the indication may include identification information assigned to each electronic device, such as a nickname. A display object corresponding to the identification information may be displayed on the display.

According to an embodiment, after providing an indication through the indicator 140, if a voice input corresponding to another specified word (e.g., a second specified word) is received, the processor 110 may wake up at least one other element included in the electronic device 100. This way, the processor 110 may replace the specified word (e.g., a first specified word) for waking up the electronic device 100 with another specified word (e.g., a second specified word) after providing the indication.

According to an embodiment, the processor 110 may manage the types of the indications and how the indications correspond to different electronic devices. For example, the processor 110 may store information (e.g., a table) of mapping a first indication to the identification information of a first electronic device and mapping a second indication to the identification information of a second electronic device. For example, red indication may be assigned to the first electronic device and blue indication may be assigned to the second electronic device. In some embodiments, the processor 110 may receive information regarding the assigned indication via the communication circuitry 160 from an external electronic device and may provide the indication based on the received information about the indication. This way, the processor 110 may not directly manage the mapping of the indications to the various electronic devices. For example, the electronic device 100 may be used as a device (e.g., a server device, a hub device, or a master device) which manages the mapping information or may be used as a device (e.g., a slave device or a client device) which receives the mapping information from another device which manages the mapping information. If the electronic device 100 is used as the master device, the processor 110 may display the indication assigned to the electronic device 100 and may transmit information about indications assigned to other external electronic devices to the other external electronic devices via the communication circuitry 160.

According to an embodiment, the processor 110 may determine whether to wake up the microphone 120 based on sensing information obtained by a sensor module (e.g., a proximity sensor, an illumination sensor, a sound pressure sensor, or the like) included in the electronic device 100. For example, using the sensor module, the processor 110 may determine whether the user or a body part of the user is close to (or in contact with) the electronic device 100. If so, the processor 110 may wake up the microphone 120 to receive voice input of the user. Further, the processor 110 may inform another external electronic device that the user is close to (or in contact with) the electronic device 100. In this case, the external electronic device may deactivate its microphone so that the external electronic device does not erroneously receive the voice input from the user. In some embodiments, the microphone in the external electronic device may be only deactivated for a specified time period. For example, after the specified time period elapses, the microphone may be reactivated. In some embodiments, the processor 110 may recognize a face or an operation of the user through a camera or the like. For example, using the camera, the processor 110 may determine whether the user looks at the electronic device 100, and may wake up the microphone 120 only in the electronic device 100 that the user looked at.

According to an embodiment, the processor 110 may adjust the received sensitivity of the voice input received through the microphone 120. For example, the processor 110 may adjust a threshold of received intensity (or receive strength or a volume level) of the voice input for voice recognition. According to an embodiment, if the received intensity is a first level and if received intensity of the voice input received by another external electronic device is at a second level lower than the first level, the processor 110 may set the threshold of received intensity for the microphone 120 and the received intensity for the microphone included in the external electronic device to values between the first level and the second level. This way, when the voice input is above the threshold of received intensity for the microphone 120 but below the threshold of received intensity for the microphone included in the external electronic device, the electronic device 100 may be able to process the voice input from the user while the external electronic device may not process the voice input. In some embodiments, the processor 110 may provide an indication depending on the threshold of received intensity to guide the user. For example, the electronic device with the highest threshold may display an indication of a first color (e.g., a green color) to inform the user that it is capable of performing voice recognition at the current volume. An electronic device with the lowest received intensity may display an indication of a second color (e.g., a red color) to inform the user that it cannot perform voice recognition at the current volume.

According to an embodiment, the processor 110 may determine whether to wake up the electronic device 100 based on usage history information of the user. For example, the processor 110 may identify the user through voiceprint identification and may identify the history in which the identified user uses the electronic device 100. For example, the history information may include the frequency of use, the number of use, the difference in the frequency of use/the number of use with another user, etc. The processor 110 can then use this history information to determine whether to wake up the electronic device 100. For example, if the electronic device 100 is an electronic device frequently used by a first user, the processor 110 may not wake up the electronic device 100 when voice input from a second user is received. In this case, the processor 110 may wake up the electronic device 100 only if voice input from the first user is received. In some embodiments, the processor 110 may determine whether to wake up the electronic device 100, based on settings information set by the user. For example, if the user sets the electronic device 100 as an electronic device frequently used by him or her, the processor 110 may wake up the electronic device 100 when voice input from the user is received.

According to an embodiment, the processor 110 may determine whether to wake up the electronic device 100 based on a location of a personal device (e.g., a smart watch, a smartphone, or the like) of the user. For example, in case of a wearable electronic device, the processor 110 may determine whether the user wears the wearable electronic device. If determining that the user wears the wearable electronic device, the processor 110 may wake up the electronic device 100 adjacent to the wearable electronic device. The processor 110 may determine a location relationship between the personal device of the user and the electronic device 100 using an illumination sensor included in the electronic device 100 or the degree of noise measured through the microphone 120. For example, if illumination values measured by the illumination sensor or values indicating the degree of noise measured through the microphone 120 are the same or similar to values measured by the personal device of the user, the electronic device 100 may determine that the personal device of the user is adjacent to the electronic device 100. According to an embodiment, the electronic device 100 may compare the measured values (e.g., the illumination value and the value indicating the degree of noise) with values measured by other external electronic devices and may select the most similar device to the personal device of the user as the device closest to the user.

Further, the location relationship between the personal device of the user and the electronic device 100 may be determined through various indoor positioning methods, such as ones using communication beacons (e.g., Bluetooth low energy (BLE), wireless-fidelity (Wi-Fi), or the like), fingerprinting, visible light communication using light-fidelity (Li-Fi), multilateration using a received signal strength indicator (RSSI) and a round trip time (RTT), etc. In the indoor positioning method using a BLE device, the BLE device may transmit an advertising packet to peripheral electronic devices and the electronic device 100 which receives the packet may calculate its location through a cell ID or multilateration using the device ID of the BLE device or the distance between the electronic device 100 and the BLE device. The packet may include data such as a device ID, a service place name, and a transmit signal strength. The electronic device 100 may calculate the distance value between the BLE device and the electronic device 100 using an RSSI signal value of the BLE device. The method for calculating the distance using the RSSI signal value may include calculating the distance using strength (power) loss of the RSSI signal or path loss between the electronic device 100 and the BLE device.

The fingerprint method may be a pattern recognition method for measuring strength of signals received based on Wi-Fi, Bluetooth, or the like. The method may involve knowing several reference locations in advance and configuring a radio map. When a reference location on the radio map is determined to have a signal strength characteristic most similar to the strength of the signal received by the electronic device 100, the reference location may be determined to be the location of the electronic device 100.

The visible light communication method may involve devices capable of transmitting light signals that are so brief that they cannot be visibly detected by humans. The light signals may be encoded with unique information (e.g. location information) so that by receiving the light signal and decoding it, the electronic device 100 may obtain location information.

The multilateration method using the RSSI and the RTT may be a method for converting an RSSI of a Wi-Fi signal to a distance using signal propagation modeling and calculating a location of the electronic device 100 by triangulating the electronic device 100 from a plurality of Wi-Fi access points (APs). Distance between a Wi-Fi AP and the electronic device 100 may be determined based on a delay time interval from when a pulse is transmitted from the Wi-Fi AP to when a response pulse is received by the Wi-Fi AP from the electronic device 100.

According to an embodiment, the processor 110 may wake-up the electronic device 100 depending on whether an instruction corresponding to a function performable by the electronic device 100 is included in a result of voice recognition of a received voice input. For example, the processor 110 may wake up the electronic device 100 only if the electronic device 100 is capable of performing the requested function in the voice input. In another embodiment, although a plurality of electronic devices recognize a specified word (e.g. the wake word), only one electronic device may respond to the specified word and the other electronic devices may remain in the sleep state. Further, the electronic devices may be able to perform the same function (e.g. play music). If an electronic device most suitable for performing the function is determined, the other electronic devices may not need to wake up. Factors in determining which device is most suitable may include the ability to process the instruction from the user, the distance from the user, the volume of the voice input from the user, etc. According to an embodiment, an apparatus for responding to the specified word and analyzing the instruction may be selected because, among the plurality of electronic devices, it is the device closest to the user. Alternatively, a server device connected with the plurality of electronic devices may analyze the instruction. In this case, the server device may determine an electronic device capable of performing a function corresponding to the instruction among the plurality of electronic devices and may transmit a related signal such that the determined electronic device performs the function.

The microphone 120 may receive various audio inputs generated outside the electronic device, such as voice inputs from the user. The microphone 120 may be one microphone located in the electronic device 100, or a plurality of microphones may be located in the electronic device 100.

The speaker 130 may output audio. For example, the speaker 130 may output a synthetic voice output corresponding to an indication. For another example, the speaker 130 may output a synthetic voice output corresponding to the result of performing a function.

The indicator 140 may be exposed on part of the housing and may provide (or display) a visual indication. For example, the indicator 140 may display a color. The indicator 140 may include, for example, an LED or a display.

The memory 150 may include a volatile and/or nonvolatile memory. For example, the memory 150 may store instructions or data associated with at least one other element of the electronic device 100. According to an embodiment, the memory 150 may store software and/or a program. The program may include an application. The application may be a set of a series of programs (or instructions) for performing at least one specified function.

According to an embodiment, the memory 150 may include mapping information that maps a type of an indication to a state of an application. Further, the memory 150 may store frequency spectrum information corresponding to various characters and frequency spectrum information of the user's voice so that the electronic device 100 may perform voice recognition and voice printing. The memory 150 may include, for example, an internal memory or an external memory.

The communication circuitry 160 may establish communication between the electronic device 100 and an external electronic device. The communication circuitry 160 may be connected to, for example, a network through wireless communication or wired communication.

According to an embodiment, at least some of the elements of the electronic device 100 may exist outside the housing of the electronic device 100 and may be electrically connected with the processor 110. For example, at least part of the microphone 120, the speaker 130, or the indicator 140 may exist outside the housing of the electronic device 100.

As described above, according to one embodiment, an electronic device (e.g., the electronic device 100) may include a housing, a user interface (e.g., the indicator 140) configured to be exposed through the housing and provide a visual indication, a first microphone (e.g., the microphone 120), a speaker (e.g., the speaker 130), a communication circuitry (e.g., the communication circuitry 160), a processor (e.g., the processor 110) configured to be electronically connected with the user interface, the first microphone, the speaker, and the communication circuitry, and a memory (e.g., the memory 150) configured to be electrically connected with the processor. The memory may store instructions, when executed, cause the processor to receive a first user voice input for waking up the electronic device through the first microphone, determine whether the electronic device is in a state for performing a selected operation based at least in part on the first user voice input, if the electronic device is in the state for performing the operation, provide a first indication using the user interface, receive a user input for selecting the electronic device to perform the operation, receive a second user voice input associated with the operation through the first microphone, transmit data associated with the operation to an external server through the communication circuitry, receive a response from the external server via the communication circuitry, and provide the response using at least one of the user interface and the speaker, and if the electronic device is not in the state for performing the operation, provide a second indication different from the first indication using the user interface and set the electronic device to a waiting state.

According to one embodiment, the instructions may cause the processor to receive information via the communication circuitry from at least one external electronic device, and determine whether the electronic device is in the state for performing the selected operation based at least in part on the information. And the at least one external electronic device may include a second microphone and obtain at least part of the first user voice input through the second microphone in a state where the at least one external electronic device is close to the electronic device.

According to one embodiment, the first indication may include a first color, and the second indication may include a second color.

As described above, according to one embodiment, an electronic device (e.g., the electronic device 100) may include a microphone (e.g., the microphone 120) configured to receive a voice input, a communication circuitry (e.g., the communication circuitry 160) configured to communicate with an external electronic device, an indicator (e.g., the indicator 140) configured to provide at least one visual indication, and a processor (e.g., the processor 110) configured to be electrically connected with the microphone, the communication circuitry, and the indicator, and a memory (e.g., the memory 150) configured to be electrically connected with the processor. The memory may store instructions, when executed, cause the processor to receive a first voice input through the microphone, perform a first voice recognition for the first voice input, if a first specified word for waking up the electronic device is included in a result of the first voice recognition, display a first visual indication through the indicator, receive a second voice input through the microphone, perform a second voice recognition for the second voice input, and if a second specified word corresponding to the first visual indication is included in a result of the second voice recognition, wake up the electronic device.

According to one embodiment, the indicator may include at least one of a light emitting diode (LED) or a display, and the first visual indication may be at least one color displayed by the indicator.

According to one embodiment, the memory may further include mapping information that maps a type of the at least one visual indication to an assignment state of the at least one visual indication, and the instructions may cause the processor to determine the first visual indication based on the mapping information.

According to one embodiment, the instructions may cause the processor to transmit information about a second visual indication different from the first visual indication to the external electronic device if a signal corresponding to the first specified word is received from the external electronic device located near the electronic device.

According to one embodiment, the signal may include at least one of information regarding when the external electronic device received the first voice input and a first volume level of the first voice input received by the external electronic device.

According to one embodiment, the instructions may cause the processor to adjust a threshold of a volume level for the second voice recognition based on the first volume level of the first voice input included in the signal and a second volume level of the first voice input received through the microphone.

According to one embodiment, the electronic device may further include a speaker, and the instructions may cause the processor to output a voice output corresponding to the first visual indication through the speaker.

According to one embodiment, the electronic device may further include a sensor module, and the instructions may cause the processor to determine at least one of whether a body part of a user is close to the electronic device and whether the body part of the user is in contact with the electronic device, based on sensing information obtained through the sensor module, and determine whether to wake up the microphone based on the determination that the body part of the user is close to the electronic device or the determination that the body part of the user is in contact with the electronic device.

According to one embodiment, the memory may include usage history information of a user for the electronic device, and the instructions may cause the processor to perform voiceprint identification for the first voice input to identify the user, and determine whether to wake up the electronic device based on the usage history information of the user.

According to one embodiment, the instructions may cause the processor to determine whether to wake up the electronic device based on whether an instruction corresponding to a function performable by the electronic device is included in the result of the second voice recognition.

Figure 2:
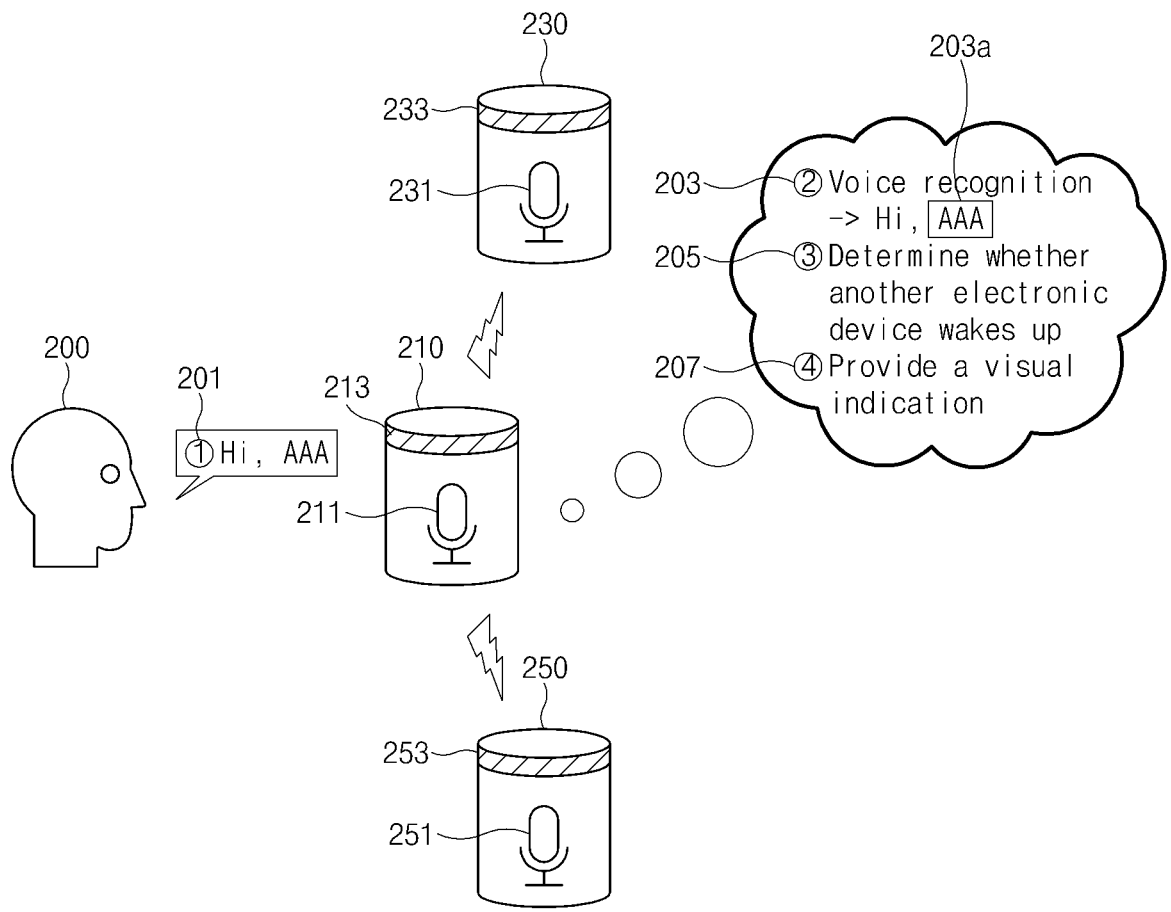
FIG. 2 is a drawing illustrating a system that processes voice inputs according to an embodiment.

FIG. 2 is a drawing illustrating a system that processes voice inputs according to an embodiment.

Referring to FIG. 2, in operation 201, a user 200 may call an electronic device (e.g., a first electronic device 210) by speaking a message including a specified word (e.g., "AAA"). However, if there are other external electronic devices (e.g., a second electronic device 230 and a third electronic device 250) which use the specified word as a wake-up word as well as the first electronic device 210 within a short range (e.g., 20 m), the other external electronic devices may also process the voice input from the user, even though the user does not intend to user the other electronic devices. Thus, there may be a need for processing so that only the first electronic device 210 wakes up.

In operation 203, the first electronic device 210 may perform voice recognition of the voice input from the user 200 received through the first microphone 211. Further, if the specified word 203a is included in the result of the voice recognition, in operation 205, the first electronic device 210 may determine whether another external electronic device can be woken up by the specified word 203a. For example, if receiving a signal corresponding to the specified word 203a from the other external electronic device, the first electronic device 210 may determine that the other external electronic device can be woken up by the specified word 203a. In this operation, each of the second electronic device 230 and the third electronic device 250 may receive the voice input of the user 200 through the second microphone 231 and the third microphone 251 and perform voice recognition. If the specified word 203a is included in the result of the voice recognition, each of the second electronic device 230 and the third electronic device 250 may transmit the signal corresponding to the specified word 203a to the electronic device 210. The signal may include identification information of each electronic device.

Receiving the signal, the first electronic device 210 may assign different indications to all three electronic devices capable of being woken up by the specified word 203a. For example, the first electronic device 210 may assign indications of a first color, a second color, and a third color to the first electronic device 210, the second electronic device 230, and the third electronic device 250, respectively.

In operation 207, the first electronic device 210 may display the assigned indication of the first color through the first indicator 213. In some embodiments, the first electronic device 210 may transmit information about the indication of the second color and information about the indication of the third color to the second electronic device 230 and the third electronic device 250, respectively. In this case, the second electronic device 230 and the third electronic device 250 may display the indication of the second color and the indication of the third color through the second indicator 233 and the third indicator 253, respectively.

According to another embodiment, the electronic devices (e.g., the first electronic device 210, the second electronic device 230, and the third electronic device 250) capable of being woken up by the same specified word 203a may select an indication themselves. For example, the first electronic device may select the indication of the first color and may transmit information about the first color to the second electronic device 230. After receiving the information about the first color, the second electronic device 230 may select the indication of the second color different from the first color and may transmit information about the first color and the second color to the third electronic device 250. After receiving the information about the first color and the second color, the third electronic device 250 may select the indication of the third color different from the first color and the second color. The method or order in which the electronic devices (e.g., the first electronic device 210, the second electronic device 230, or the third electronic device 250) transmit their color information to other electronic devices is not limited thereto. Various methods may be used to determine the method or order.

Figure 3:
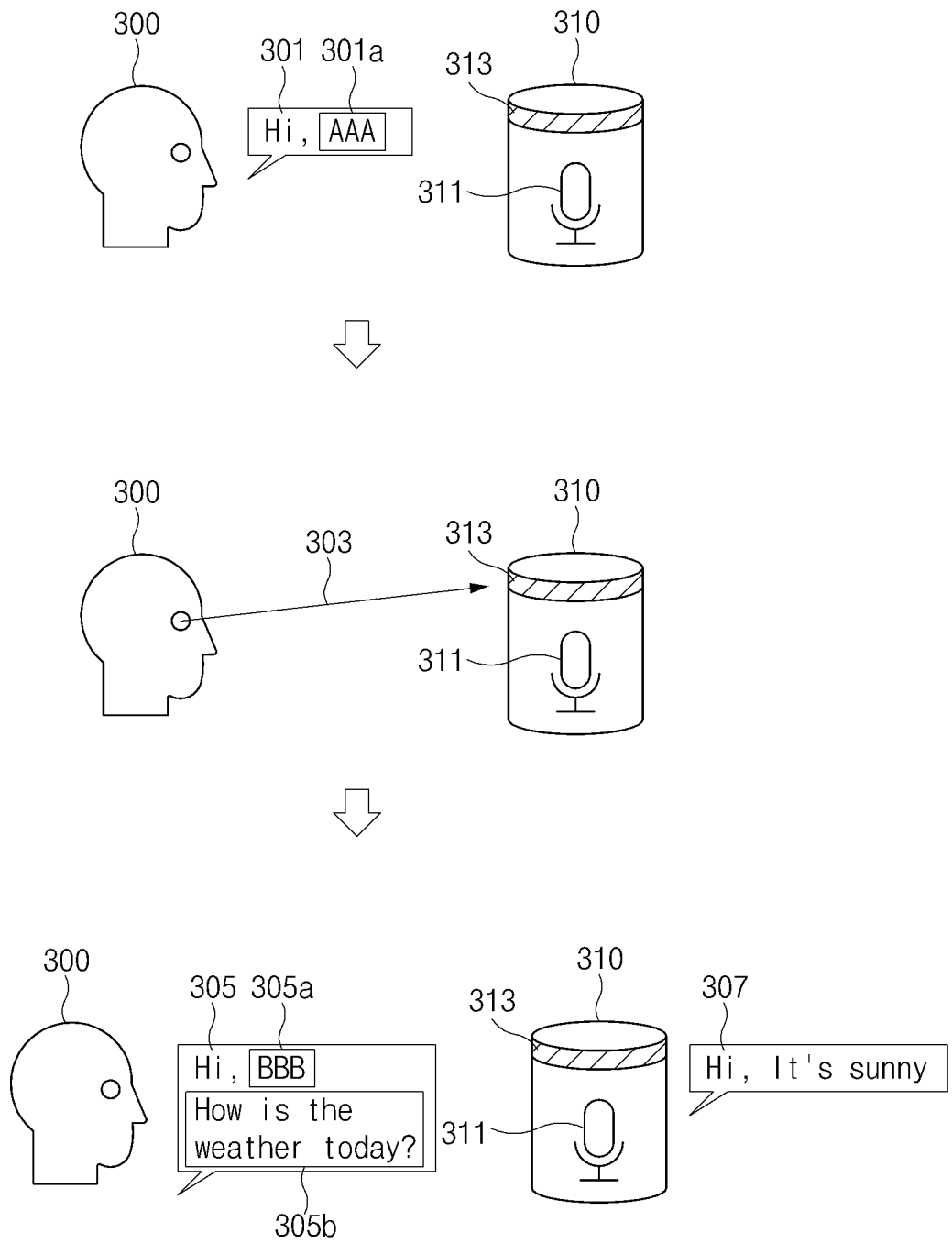
FIG. 3 is a drawing illustrating a method for providing an indication according to an embodiment.

FIG. 3 is a drawing illustrating a method for providing an indication according to an embodiment.

Referring to FIG. 3, an electronic device 310 may receive a first voice input 301 of the user 300 through the microphone 311. If a first specified word 301a is included in the result of voice recognition for the received first voice input 301, the electronic device 310 may display an indication assigned to the electronic device 310 through an indicator 313. The indication may include, for example, a color assigned for the electronic device 310. According to an embodiment, the assignment of the indication may be performed based on mapping information that maps the type of indication and the assignment state of the indication. This mapping information may be stored in a database managed by the electronic device 310. In some embodiments, the database may be managed by a separate server device, a hub device, or a master device, and the electronic device 310 may receive information about the indication via a communication circuitry and may display the corresponding indication through the indicator 313.

If the electronic device 310 displays a specified indication through the indicator 313, the user 300 may see the displayed indication (see reference numeral 303). In some embodiments, the electronic device 310 may output the specified indication as voice output through a voice output device (e.g., a speaker) so that the user may hear the indication. If the user 300 speaks a second voice input 305 including a new second specified word 305*a* corresponding to the indication (i.e. either the displayed indication or the voiced indication), the electronic device 310 may determine that the second specified word 305*a* is included in the result of voice recognition for the second voice input 305. The electronic device 310 may then wake up at least one of its elements. The second voice input 305 may include the second specified word 305*a* and an instruction 305*b*. In this case, the electronic device 310 may wake up at least one element for performing a function corresponding to the instruction 305*b*. In some embodiments, the electronic device 310 may provide audio output for informing the user 300 that the electronic device 310 is woken up and/or audio output 307 for informing the user 300 of the result of the performance of the function. The electronic device 310 may also display an indication for informing the user that the electronic device 310 is woken up, through the indicator 313.

Figure 4:
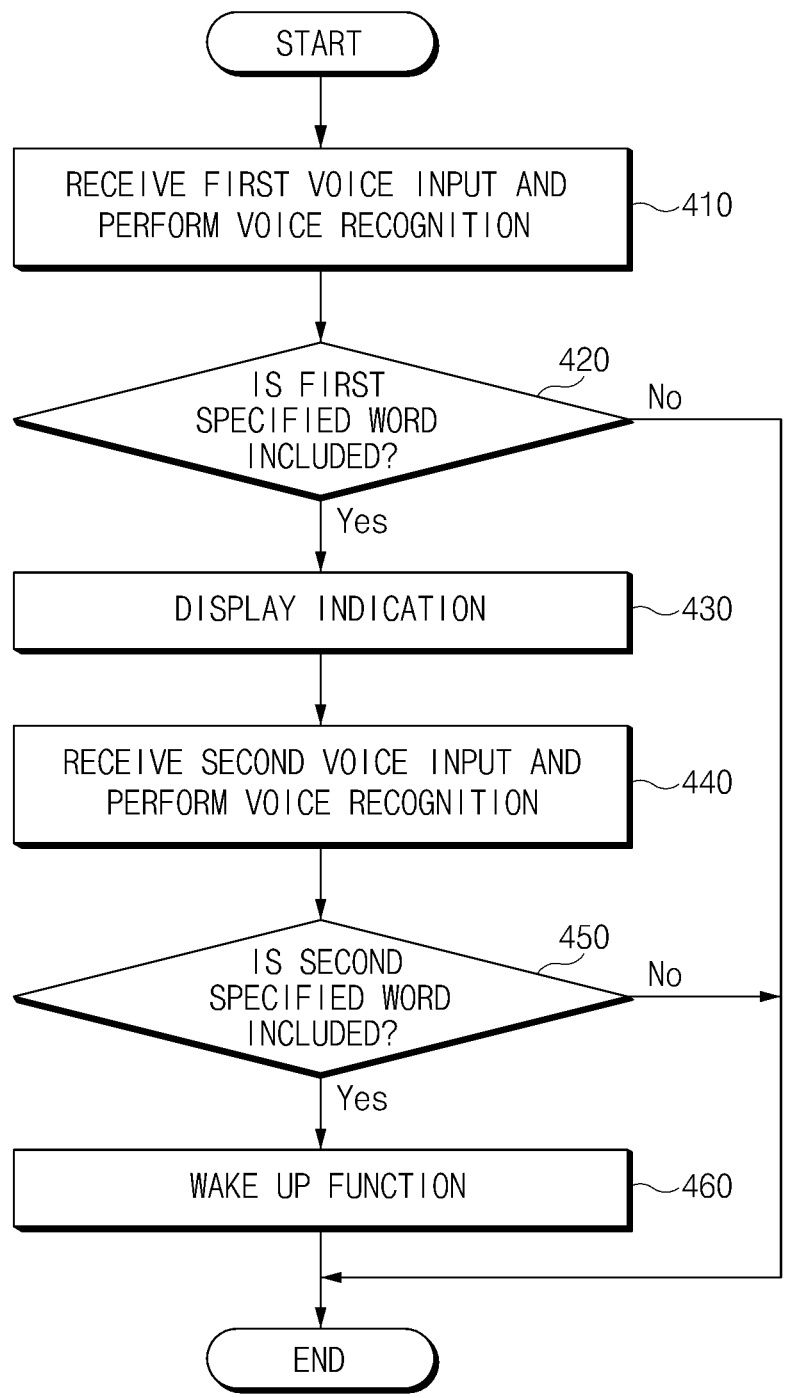
FIG. 4 is a flowchart illustrating an operation method of an electronic device that processes voice inputs according to an embodiment.

FIG. 4 is a flowchart illustrating an operation method of an electronic device that processes voice inputs according to an embodiment.

Referring to FIG. 4, in operation 410, an electronic device (e.g., a processor 110 of FIG. 1) may receive a first voice input through a microphone (e.g., a microphone 120 of FIG. 1) and may perform voice recognition for the received first voice input. The first voice input may include a specified word (e.g. a wake-up word) for waking up the electronic device.

In operation 420, the electronic device (e.g., the processor 110) may determine whether a first specified word is included in the result of the voice recognition. For example, the processor 110 may determine whether the first specified word is included in the text converted from the first voice input.

If the first specified word is included in the result of the voice recognition, in operation 430, the electronic device (e.g., the indicator 140 of FIG. 1) may display an indication. According to an embodiment, the electronic device (e.g., the processor 110) may specify an indication to distinguish the electronic device from an external electronic device based on mapping information mapping the types of indications to the assignment states of the indications. In some embodiments, the electronic device may display an indication it selected for itself irrespective of the mapping information. In this case, the electronic device (e.g., the communication circuitry 160 of FIG. 1) may transmit information about the selected indication to the external electronic device. Receiving the information about the indication, the external electronic device may select an indication that is different from the indication of the electronic device.

If the first specified word is not included in the result of performing the voice recognition in operation 420, the electronic device (e.g., the processor 110) according to an embodiment may maintain the waiting state (i.e. the sleep state).

In operation 440, the electronic device (e.g., the processor 110) may receive a second voice input through the microphone (e.g., the microphone 120) and may perform voice recognition for the received second voice input. The second voice input may be one spoken by the user after he or she has seen the displayed indication. The second voice input may include the second specified word corresponding to the indication.

In operation 450, the electronic device (e.g., the processor 110) may determine whether the second specified word is included in the result of the voice recognition. For example, the processor 110 may determine whether the second specified word is included in the text converted from the second voice input.

If the second specified word is included in the result of the voice recognition, in operation 460, the electronic device (e.g., the processor 110) may wake up at least one element in the electronic device. For example, the electronic device (e.g., the processor 110) may change from the waiting state to an active state where the electronic device may perform a function.

If the second specified word is not included in the result of the voice recognition in operation 450, the electronic device (e.g., the processor 110) according to an embodiment may display an indication different from the indication displayed in step 430 and/or may maintain the waiting state.

Figure 5:
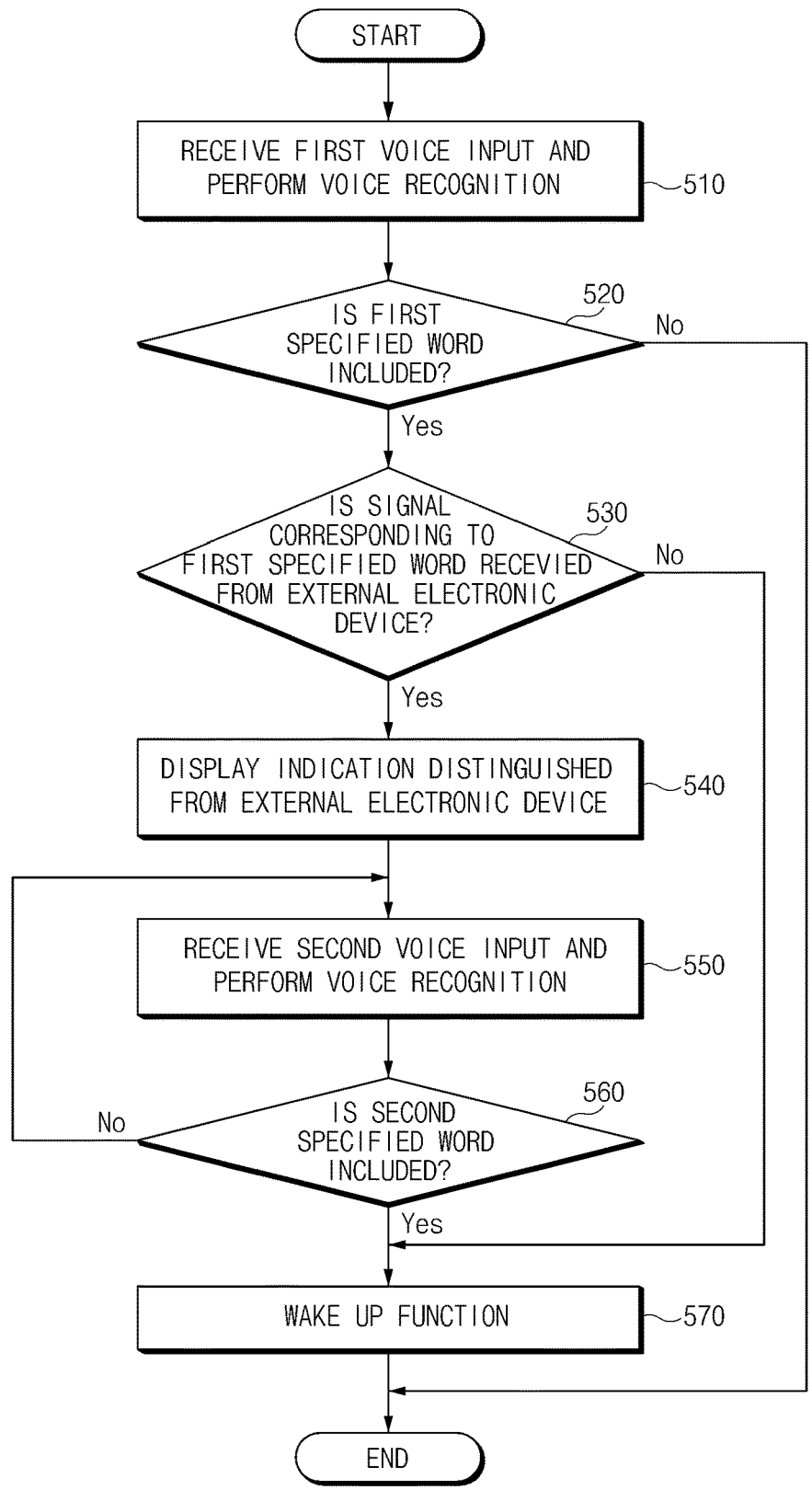
FIG. 5 is a flowchart illustrating another operation method of an electronic device that processes voice inputs according to an embodiment.

FIG. 5 is a flowchart illustrating another operation method of an electronic device that processes voice inputs according to an embodiment.

Referring to FIG. 5, in operation 510, an electronic device (e.g., an electronic device 100 or a processor 110 of FIG. 1) may receive a first voice input and may perform voice recognition for the first voice input. The first voice may include a specified word (or a wake-up word) for waking up the electronic device. Further, the specified word may be used as the wake-up word of another external electronic device as well as the electronic device.

In operation 520, the electronic device may determine whether the first specified word is included in the result of the voice recognition. For example, the processor 110 may determine whether the first specified word is included in text converted from the first voice input.

If the first specified word is included in the result of the voice recognition, in operation 530, the electronic device (e.g., the processor 110) may determine whether a signal corresponding to the first specified word is received from the external electronic device. For example, the external electronic device capable of being woken up by the first specified word may transmit the signal corresponding to the first specified word. In this case, the electronic device may receive the transmitted signal via a communication circuitry (e.g., a communication circuitry 160 of FIG. 1) and may verify that there is another external electronic device capable of being woken up by the first specified word.

If receiving the signal corresponding to the first specified word from the external electronic device, in operation 540, the electronic device may display an indication distinguishing the electronic device from the external electronic device through an indicator. For example, the processor 110 may specify an indication to distinguish itself from the external electronic device based on mapping information mapping the types of indications to the assignment states of the indications. The electronic device may then display the specified indication through an indicator (e.g., an indicator 140 of FIG. 1).

In operation 550, the electronic device may receive a second voice input through the microphone (e.g., the microphone 120 of FIG. 1) and may perform voice recognition for the second voice input. The second voice input may be spoken by the user has seen the displayed indication, and the second voice input may include a second specified word corresponding to the indication. For example, if a red indication is displayed through the indicator, the second voice input may be "Hi, red" where "red" corresponds to the indication and is the second specified word. For another example, the user may speak an instruction including the second specified word, for example, "Red, how is the weather today?"

In operation 560, the electronic device may determine whether the second specified word is included in the result of the voice recognition. For example, the electronic device may determine whether the second specified word is included in the text converted from the second voice input.

If the second specified word is included in the result of performing the voice recognition, in operation 570, the electronic device may wake up at least one element of the electronic device. Alternatively, if the second specified word and an instruction are included in the result of the voice recognition, the electronic device may wake itself up to perform a function corresponding to the instruction.

If the second specified word is not included in the result of performing the voice recognition, the electronic device may return to operation 550. For example, the electronic device may repeatedly perform operations 550 and 560 until the second voice input including the second specified word is received. In some embodiments, if the second voice input including in the second specified word is not received for a specified time period, the electronic device may skip operations 550 to 570 and may change to a waiting state or an inactive (sleep) state.

Figure 6:
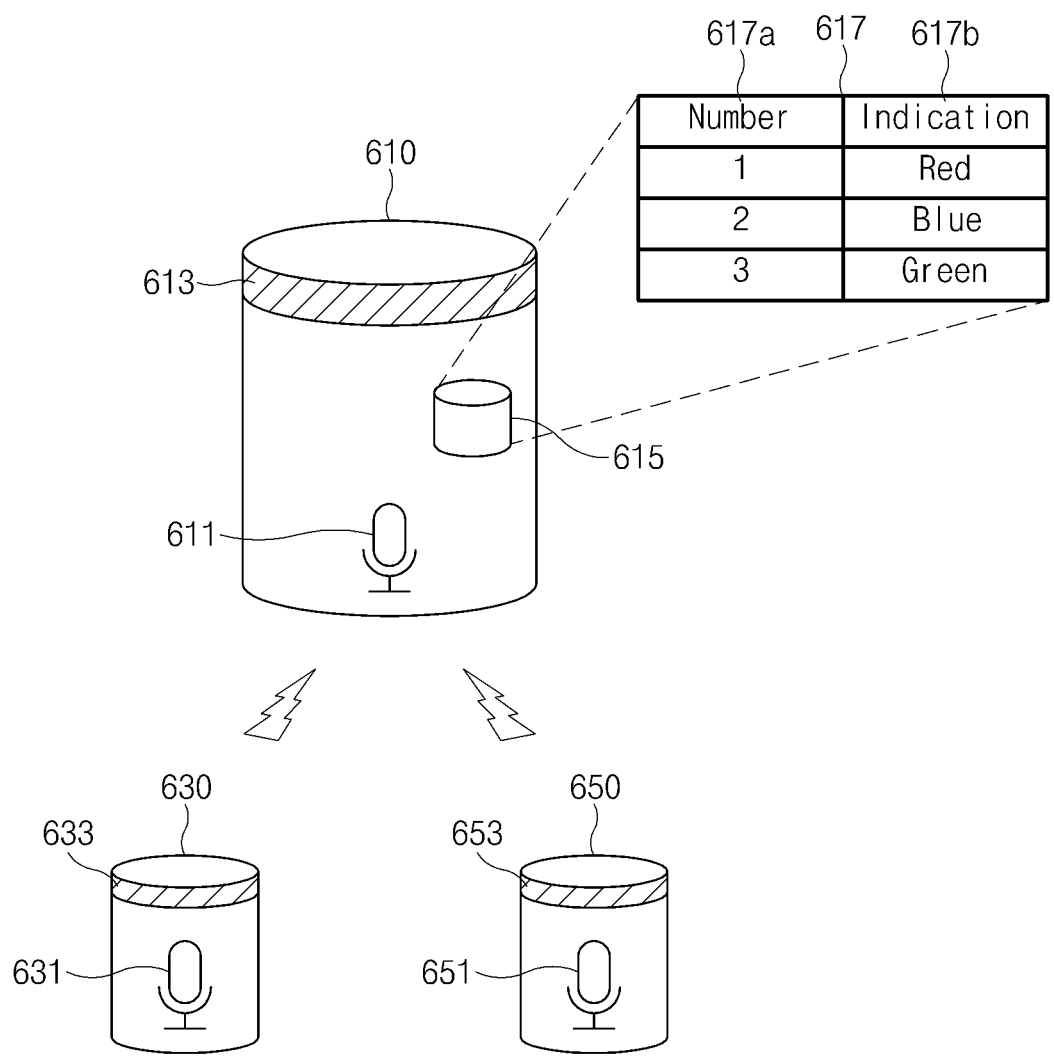
FIG. 6 is a drawing illustrating a method for determining an indication according to an embodiment.

FIG. 6 is a drawing illustrating a method for determining an indication according to an embodiment.

Referring to FIG. 6, a first electronic device 610 may receive a voice input through a first microphone 611. If a specified word is included in a result of voice recognition for the received voice input, the first electronic device 610 may provide (or display) a first indication through the first indicator 613. According to an embodiment, the first electronic device 610 may manage mapping information mapping the types of indications to the assignment states of the indications in a database 615 stored in memory (e.g., the memory 150 of FIG. 1). Thus, the first electronic device 610 may determine the first indication based on the mapping information 617. The mapping information 617 may include, for example, information associated with an assigning order 617a of electronic devices and types 617b of indications.

According to an embodiment, the types 617b of the indications may be color, unique nicknames of the electronic devices, etc. Further, each electronic device (e.g., the first electronic device 610, the second electronic device 630, or a third electronic device 650) may display its corresponding indication through an indicator (e.g., the first indicator 613, a second indicator 633, or a third indicator 653) or may output voice information corresponding to the indication through its speaker. In some embodiments, the types 617b of the indications may depend on how each electronic device (e.g., the first electronic device 610, the second electronic device 630, or the third electronic device 650) outputs the indications. For example, if one electronic device outputs the indication through an LED, the indication may be set to a specific color. But if the electronic device outputs the indication on a display, the indication may be set to a display object that includes a specific color or a nickname of the device. And if the electronic device outputs an indication through a speaker, the indication may be set to voice information corresponding to a specific color or a nickname.

According to an embodiment, the first electronic device 610 may determine indications of other external electronic devices and may transmit the determined indications to the external electronic devices. In this embodiment, the first electronic device 610 may function as a master device. The second electronic device 630 and the third electronic device 650 may receive voice inputs from the user through a second microphone 631 and a third microphone 651, respectively. If a specified word is included in the result of the voice recognition for the received voice input, the second electronic device 630 and the third electronic device 650 may transmit a signal corresponding to the specified word to the electronic device 610. In this case, the first electronic device 610 may receive the signal transmitted from the second electronic device 630 and the third electronic device 650 and may sequentially assign the second indication and the third indication to the second electronic device 630 and the third electronic device 650, respectively, based on an order where the signal is received. Further, the first electronic device 610 may transmit information about the second indication and information about the third indication to the second electronic device 630 and the third electronic device 650, respectively, via a communication circuitry (e.g., a communication circuitry 160 of FIG. 1). Receiving the information about the second indication and the information about the third indication, the second electronic device 630 and the third electronic device 650 may provide (or display) the second indication and the third indication through the second indicator 633 and the third indicator 653, respectively.

According to an embodiment, the types 617b of the indications assigned to the electronic devices may not duplicate each other. Further, if one electronic device is selected (or woken up) by a user, the type 617b of the assigned indication may be reset. In some embodiments, if the indications are spoken but there is some overlap in the indications, then these indications may not be used. For example, spoken indications "blue" and "sky blue" overlap with the word "blue" and may cause confusion. Thus, they may not be used as indications. Further, when the indications are displayed colors, to avoid confusion, only colors that highly contrast with each other may be used. For example, the various electronic devices may be use blue and sky blue as two different indications.

According to an embodiment, the types 617b of the indications assigned to the electronic devices may be differently specified according to performance of the electronic devices, a temporal order of the received voice input, volume levels of the received voice inputs, etc. For example, the indication may be assigned sequentially from an electronic device with the best performance. Alternatively, the indication may be assigned sequentially from an electronic device having the best response time to a voice input. Alternatively, the indication may be assigned sequentially from an electronic device with the highest volume of the received voice input. Alternatively, the indication may be assigned from an electronic device which is always powered on. In some embodiments, the types 617b of the indications assigned to the electronic devices may be differently specified according to settings specified by the user.

Figure 7:
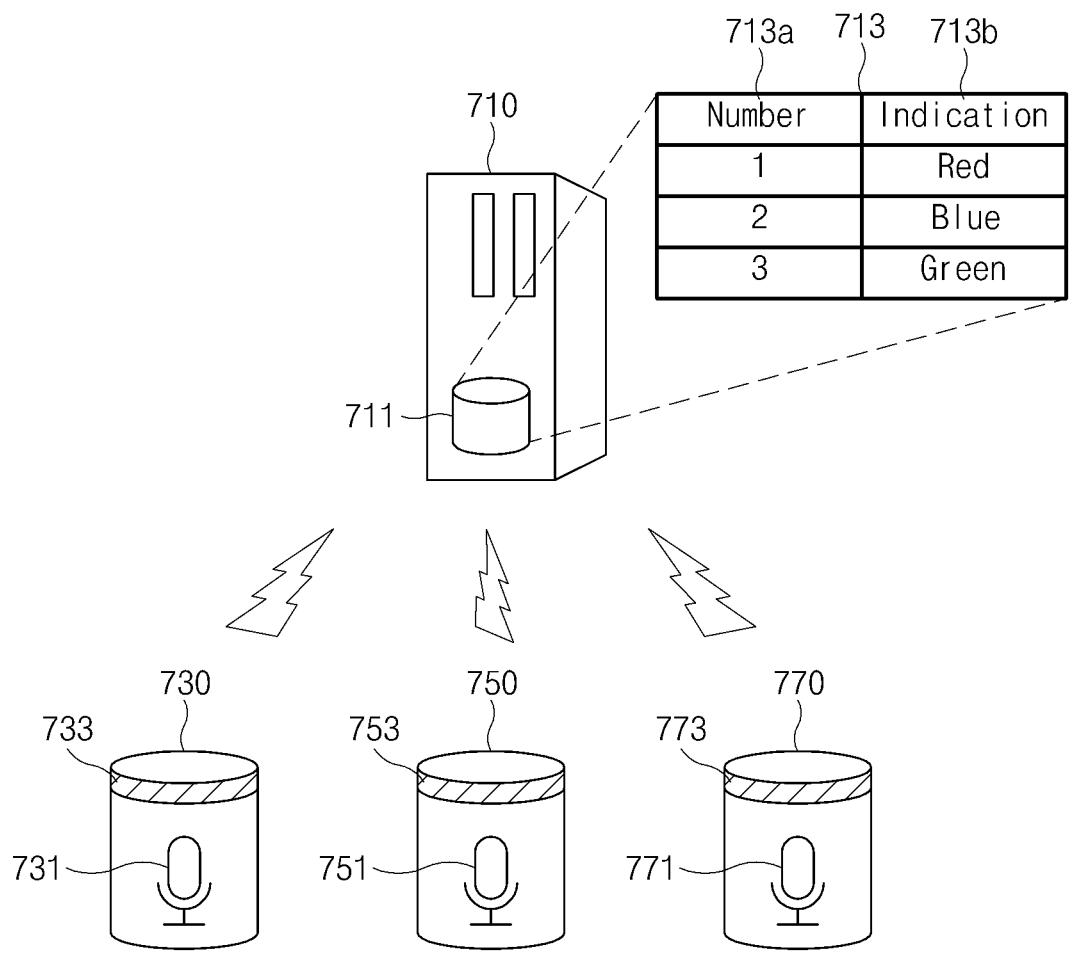
FIG. 7 is a drawing illustrating another method for determining an indication according to an embodiment.

FIG. 7 is a drawing illustrating another method for determining an indication according to an embodiment.

Referring to FIG. 7, if there are a plurality of electronic devices (e.g., a first electronic device 730, a second electronic device 750, and a third electronic device 770) capable of being called (woken up) by one specified word (e.g., a wake-up word) and if they receive voice inputs including the specified word, the electronic devices may transmit signals corresponding to the specified word. In this embodiment, each of the plurality of electronic devices may function as a slave or client device. In this case, there may be a need for a server device 710 (or a hub device) which determines the types of indications for the plurality of electronic devices and transmits the information about the determined indications to the plurality of electronic devices.

The server device 710 may manage, for example, mapping information 713 that maps the types of indications to the assignment states of the indications in a database 711. The mapping information 713 may include, for example, information associated with an assigning order 713a of the electronic devices and types 713b of indications.

The first electronic device 730, the second electronic device 750, and the third electronic device 770 may receive voice inputs through a first microphone 731, a second microphone 751, and a third microphone 771, respectively. If the specified word is included in the result of the voice recognition for the received voice inputs, the first electronic device 730, the second electronic device 750, and the third electronic device 770 may transmit signals corresponding to the specified word to the server device 710. The server device 710 may receive the signals transmitted from at least one of the electronic devices (e.g., the first electronic device 730, the second electronic device 750, and the third electronic device 770) and may transmit information based on the mapping information 713 to the electronic devices. For example, the server device 710 may receive signals transmitted from the first electronic device 730, the second electronic device 750, and the third electronic device 770 and may assign a first indication, a second indication, and a third indication to the first electronic device 730, the second electronic device 750, and the third electronic device 770 sequentially based on the mapping information 713 in an order in which the signals are received. For another example, the server device 710 may receive signals transmitted form the first electronic device 730, the second electronic device 750, and the third electronic device 770 and may assign the first indication, the second indication, and the third indication to the first electronic device 730, the second electronic device 750, and the third electronic device 770, respectively, based on assignment history. The server device 710 may transmit information about the first indication, information about the second indication, and information about the third indication to the first electronic device 730, the second electronic device 750, and the third electronic device 770, respectively. Respectively receiving the information about the first indication, the information about the second indication, and the information about the third indication, the first electronic device 730, the second electronic device 750, and the third electronic device 770 may provide (or display) the first indication, the second indication, and the third indication through the first indicator 733, the second indication 753, and the third indication 773, respectively.

Figure 8:
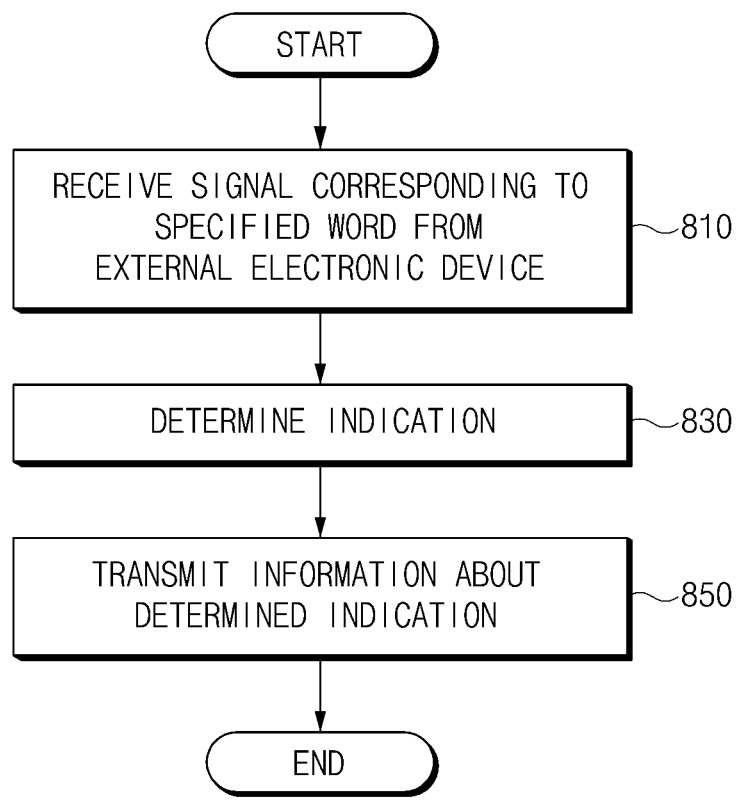
FIG. 8 is a flowchart illustrating an operation method of an electronic device for determining an indication according to an embodiment.

FIG. 8 is a flowchart illustrating an operation method of an electronic device for determining an indication according to an embodiment.

According to an embodiment, referring to FIG. 8, in operation 810, an electronic device (e.g., an electronic device 100 or a processor 110 of FIG. 1) may receive a signal corresponding to a specified word via a communication circuitry (e.g., a communication circuitry 160 of FIG. 1) from at least one external electronic device. The electronic device may be a server device, a hub device, or a master device. The signal corresponding to the specified word may include information relating to the fact that the external electronic device recognizes the specified word and may wake up based on the recognition. The signal corresponding to the specified word may include an indication for when the external electronic device received the voice input containing the specified word, received strength of the voice input, etc.

In operation 830, the electronic device (e.g., the electronic device 100 or the processor 110) may determine an indication for the external electronic device. According to an embodiment, the electronic device may manage mapping information mapping the types of indications to the assignment states of the indications in a database stored in memory (e.g., a memory 150 of FIG. 1). Thus, the electronic device may determine (i.e. assign) the indication for the external electronic device based on the mapping information stored in the database.

In operation 850, the electronic device (e.g., the electronic device 100 or the processor 110) may transmit information about the determined indication to the external electronic device via the communication circuitry (e.g., the communication circuitry 160). Receiving the information about the indication, the external electronic device may provide (or display) the indication through its indicator.

Figure 9:
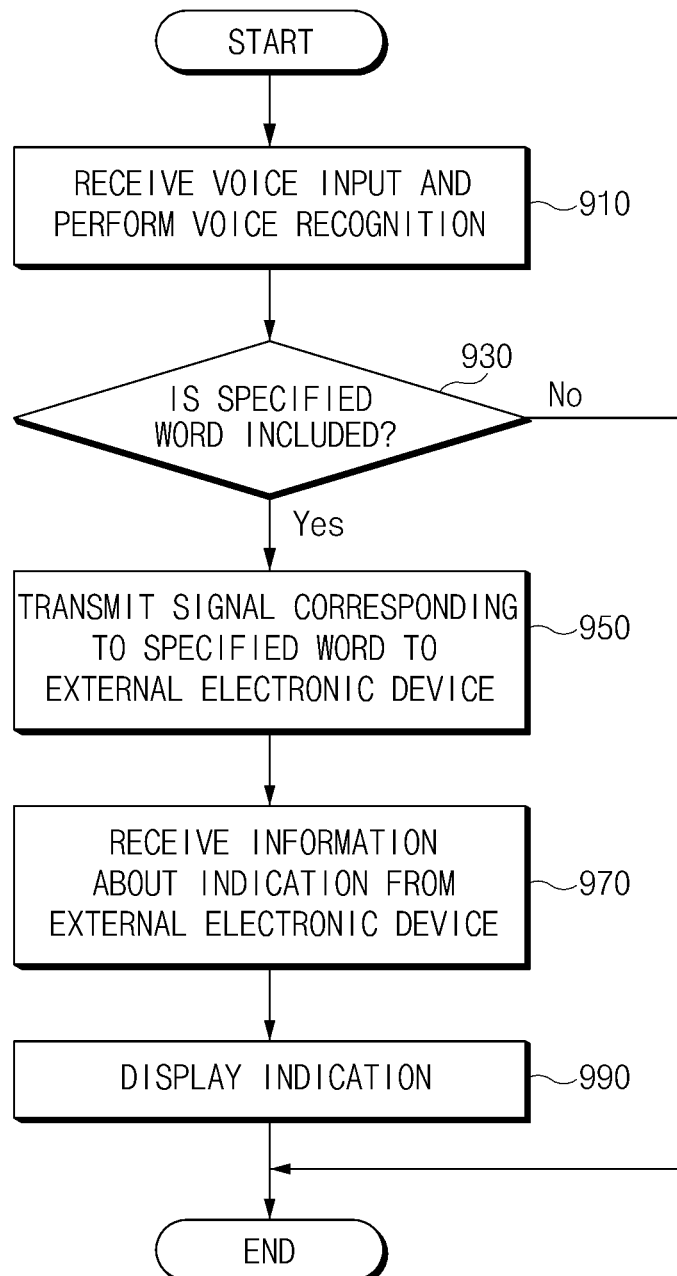
FIG. 9 is a flowchart illustrating a method for displaying an indication determined through an external electronic device at an electronic device according to an embodiment.

FIG. 9 is a flowchart illustrating a method for displaying an indication determined through an external electronic device at an electronic device according to an embodiment.

According to an embodiment, referring to FIG. 9, in operation 910, an electronic device (e.g., an electronic device 100 or a processor 110 of FIG. 1) (e.g., the slave device) may receive a voice input through a microphone (e.g., the microphone 120 of FIG. 1) and may perform voice recognition for the received voice input. According to an embodiment, the processor 110 may analyze voice data corresponding to the voice input received through the microphone and may convert the voice data into text.

In operation 930, the electronic device (e.g., the electronic device 100 or the processor 110) may determine whether a specified word is included in the result of the voice recognition. For example, the processor 110 may determine whether the specified word is included in the converted text.

If the specified word is included in the result of the voice recognition, in operation 950, the electronic device (e.g., the electronic device 100 or the processor 110) may transmit a signal corresponding to the specified word to an external electronic device (e.g., a server device, a hub device, or a master device). In some embodiments, the electronic device may send out the signal corresponding to the specified word via a communication circuitry (e.g., a communication circuitry 160 of FIG. 1). Further, the electronic device may transmit the signal and may change to a state of waiting for wake-up. For example, the electronic device may change to a state of waiting for a response to the signal.

In operation 970, the electronic device (e.g., the electronic device 100 or the processor 110) may receive information about an indication via the communication circuitry (e.g., the communication circuitry 160) from the external electronic device. If receiving the indication, in operation 990, the electronic device (e.g., the electronic device 100 or the processor 110) may provide (or display) the indication through an indicator (e.g., the indicator 140 of FIG. 1).

Figure 10:
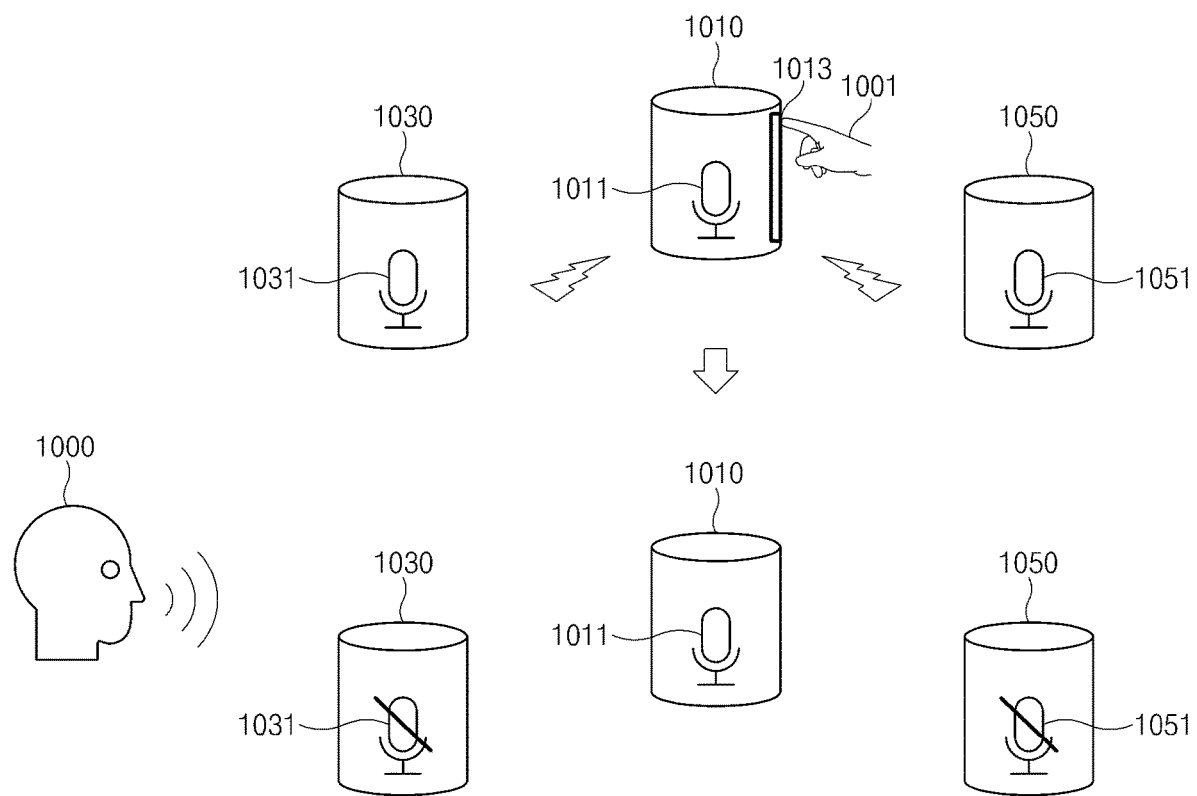
FIG. 10 is a drawing illustrating a method for determining whether to wake up an electronic device based on a proximity sensor according to an embodiment.

FIG. 10 is a drawing illustrating a method for determining whether to wake up an electronic device based on a proximity sensor according to an embodiment.

Referring to FIG. 10, electronic devices (e.g., a first electronic device 1010, a second electronic device 1030, and a third electronic device 1050) may determine whether to wake up microphones (e.g., a first microphone 1011, a second microphone 1031, and a third microphone 1051) included in the electronic devices depending on whether a body part of the user 1000 (e.g., a finger) is close to (or in contact with) the electronic devices. For example, the electronic devices may determine whether the body part 1001 is close to (or in contact with) the electronic devices based on sensing information obtained by a sensor module (e.g., a proximity sensor, an illumination sensor, a sound pressure sensor, or the like). If the body part 1001 is close to (or in contact with) one of the electronic devices, that electronic device may wake up its microphones to receive a voice input from the user 1000. Further, that electronic device may transmit a notification to another external electronic device indicating that it has detected the body part 1001. In this case, after receiving the notification, the external electronic device may deactivate its own microphone so that it does not receive the voice input of the user 1000. In the example shown in FIG. 10, the body part 1001 of the user 1000 is close to (or in contact with) the first electronic device 1010. The first electronic device 1010 may wake up the first microphone 1011 and may transmit a notification to the second electronic device 1030 and the third electronic device 1050, where the notification indicates that the body part 1001 is close to (in contact with) the first electronic device 1010. After receiving the notification, the second electronic device 1030 and the third electronic device 1050 may deactivate the second microphone 1031 and the third microphone 1051, respectively.

According to an embodiment, the microphone may be deactivated for a specified time period. After the specified time period elapses, the microphone may be reactivated. For example, after the specified time period elapses, the first electronic device 1010 may deactivate the first microphone 1011, and the second electronic device 1030 and the third electronic device 1050 may wake up the second microphone 1031 and the third microphone 1051, respectively. In another example, the first electronic device 1010 may maintain the wake-up state of the microphone 1011, and the second electronic device 1030 and the third electronic device 1050 may wake up the second microphone 1031 and the third microphone 1051, respectively.

According to an embodiment, if a plurality of electronic devices receive a voice of the user 1000, the electronic device which receives an additional selection (e.g., a finger touch, proximity, or the like) of the user 1000 may maintain a wake-up state (e.g., a state of waiting for receiving an additional voice) and the electronic device which does not receive a selection of the user 1000 may change to an inactive state.

Figure 11:
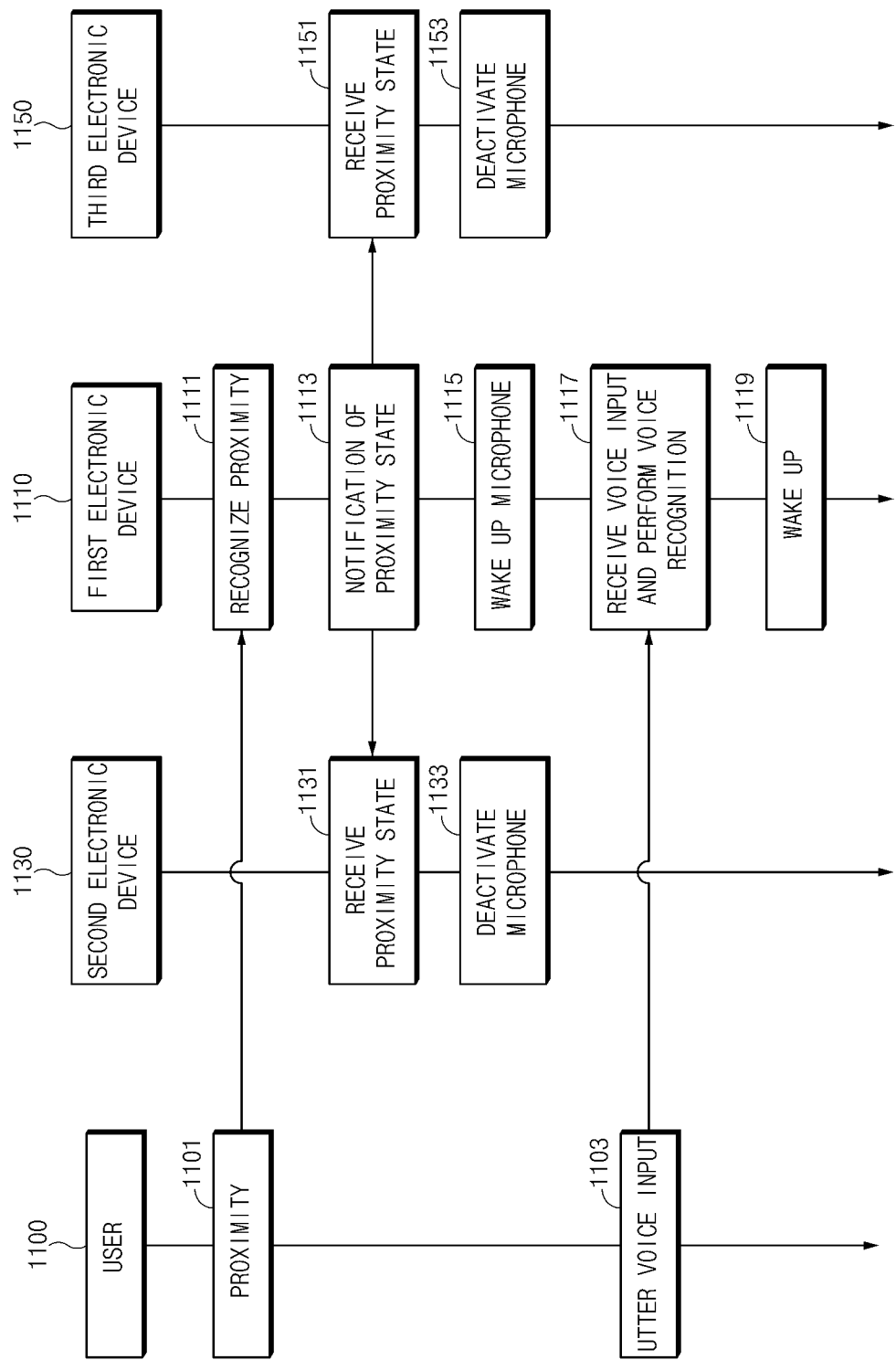
FIG. 11 is a signal sequence diagram illustrating a system for determining whether to wake up an electronic device based on a proximity sensor according to an embodiment.

FIG. 11 is a signal sequence diagram illustrating a system for determining whether to wake up an electronic device based on a proximity sensor according to an embodiment.

According to an embodiment, a user 1000 may select (e.g., be close to or come into contact with) one of a plurality of electronic devices (e.g., a first electronic device 1110, a second electronic device 1130, and a third electronic device 1150) and may speak a specified word (e.g., a wake-up word). The order of the user operations may be reversed. In other words, the user may speak the specified word (e.g., the wake-up word) and then may select one of the plurality of electronic devices.

Referring to FIG. 11, in this example, in operation 1101, the user 1100 may be close to (or come into contact with) one electronic device (e.g., the first electronic device 1110). For example, the user 1100 may touch the one electronic device using a part of his or her body (e.g., a finger).

In operation 1111, the first electronic device 1110 may recognize the proximity (or contact) of the user 1100. According to an embodiment, the first electronic device 1110 may receive the proximity (or contact) of the user 1100 based on sensing information obtained by a sensor module (e.g., a proximity sensor, an illumination sensor, a sound pressure sensor, or the like).

Recognizing the proximity (or contact) of the user 1100, in operation 1113, the first electronic device 1110 may inform external electronic devices (e.g., the second electronic device 1130 and the third electronic device 1150) of the proximity (or contact) state of the user 1100. Further, in operation 1115, the first electronic device 1110 may wake up a microphone (e.g., a microphone 120 of FIG. 1) included in the first electronic device 1110. If the microphone included in the first electronic device 1110 is already woken up, the first electronic device 1110 may maintain the wake-up state of the microphone. In operations 1131 and 1151, the second electronic device 1130 and the third electronic device 1150 may receive the proximity (or contact) state of the user 1100. Receiving the proximity (or contact) of the user 1100, in operations 1133 and 1153, the second electronic device 1130 and the third electronic device 1150 may deactivate microphones included in the second electronic device 1130 and the third electronic device 1150, respectively, so that the second electronic device 1130 and the third electronic device 1150 are prevented from detecting the voice input from the user.

In operation 1103, the user 1100 may utter (or speak) a voice input, which may include an instruction corresponding to a function to be performed by the first electronic device 1110. In operation 1117, the first electronic device 1110, having an awake microphone, may receive the voice input through the microphone and may perform voice recognition for the received voice input. As explained above, the second electronic device 1130 and the third electronic device 1150 may not detect the voice input because their microphones are deactivated. The microphones of the second electronic device 1130 and the third electronic device 1150 may be deactivated for a specified time period or until they receive a notification that the proximity state of the user 1100 has changed (e.g., the user is no longer close to or in contact with the first electronic device 1110).

In operation 1119, the first electronic device 1110 may wake up at least some of its modules related to the function specified by the user to perform that function.

Figure 12:
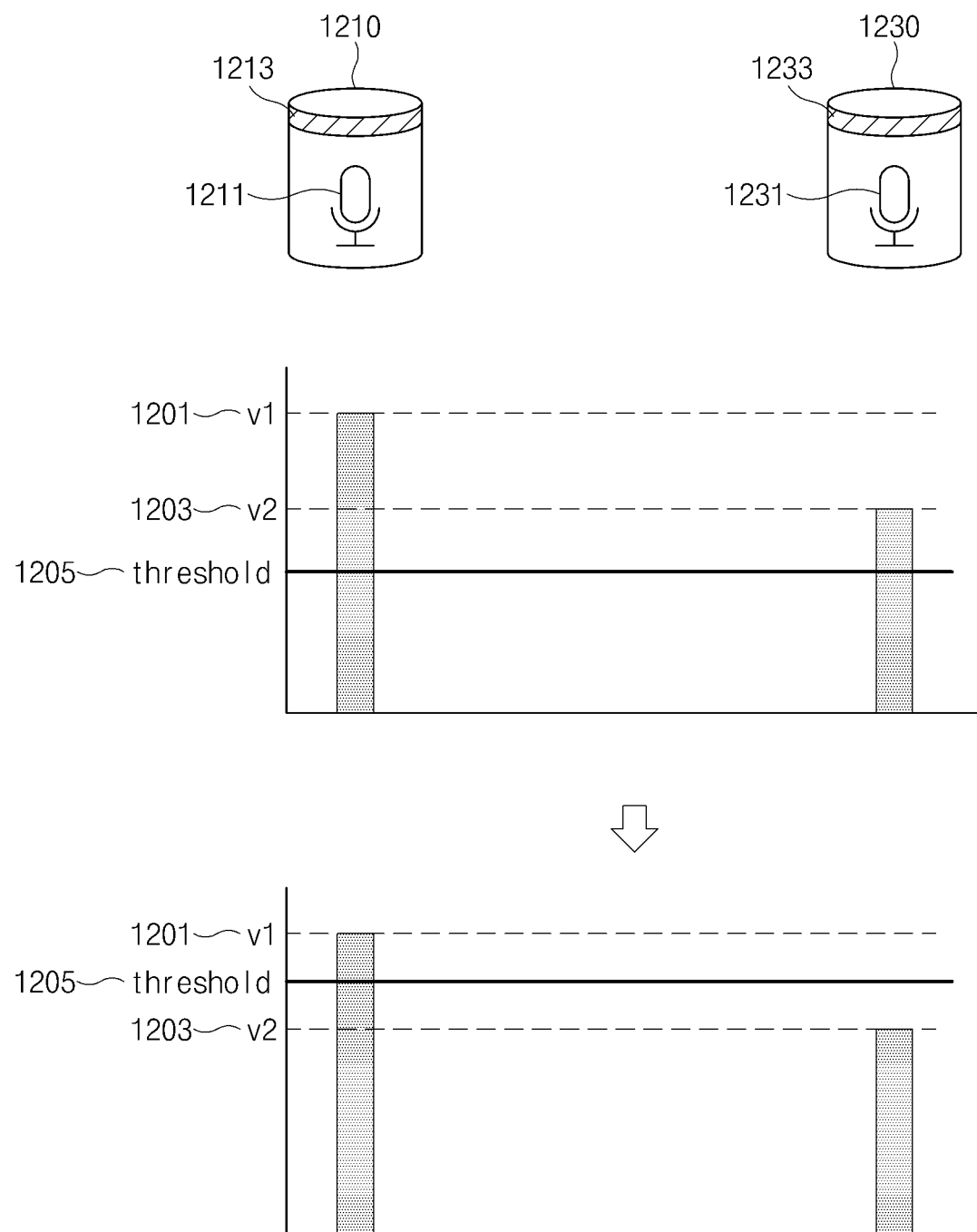
FIG. 12 is a drawing illustrating a method for determining whether to wake up an electronic device through adjustment of receive sensitivity of a voice input according to an embodiment.

FIG. 12 is a drawing illustrating a method for determining whether to wake up an electronic device through adjustment of received sensitivity of a voice input according to an embodiment.

Referring to FIG. 12, an electronic device (e.g., a first electronic device 1210 or a second electronic device 1230) may adjust receive sensitivity of a voice input received through a microphone (e.g., a first microphone 1211 or a second microphone 1231). For example, the electronic device may adjust a threshold 1205 of the received intensity of the voice input. According to an embodiment, after the adjustment, only one of the plurality of electronic devices may recognize the voice input of the user. The threshold 1205 may indicate, for example, a minimum value for preventing errors in voice recognition. Further, each electronic device may have a different threshold. For example, the electronic devices may have different thresholds depending on the performances of the electronic devices.

As shown in FIG. 12, if the received intensity of the first microphone 1211 is a first level (v1) 1201 and if the received intensity of the second microphone 1231 is a second level (v2) 1203, the threshold 1205 of the received intensity may be adjusted to a value between the first level 1201 and the second level 1203. For example, if the first level 1201 is higher than the second level 1203, the threshold 1205 may be adjusted to be lower than the first level 1201 and be higher than the second level 1203. Thus, voice inputs may be processed by the first electronic device 1210 but not the second electronic device 1230. As a result, only the first electronic device 1210 may be woken up in response to the voice input from the user.

According to an embodiment, the electronic device (e.g., the first electronic device 1210 or the second electronic device 1230) may change the type of indication shown in the indicator (e.g., the first indicator 1213 or the second indicator 1233) according to the received intensity. For example, the first electronic device 1210 in which the received intensity is the first level 1201 may display an indication of a first color, and the second electronic device 1230 in which the received intensity is the second level may display an indication of a second color different from the first color. Thus, a user may verify each indication (e.g., a first indication or a second indication) so that he or she knows which electronic device is capable of performing voice recognition.

According to an embodiment, the threshold 1205 may be set to correspond to the received intensity of a voice input including a first specified word. Thus, if the user is distant from an electronic device or changes the direction where he directs his voice input, since the received intensity of the voice input does not meet the threshold 1205, the electronic device may not process the voice input.

Figure 13:
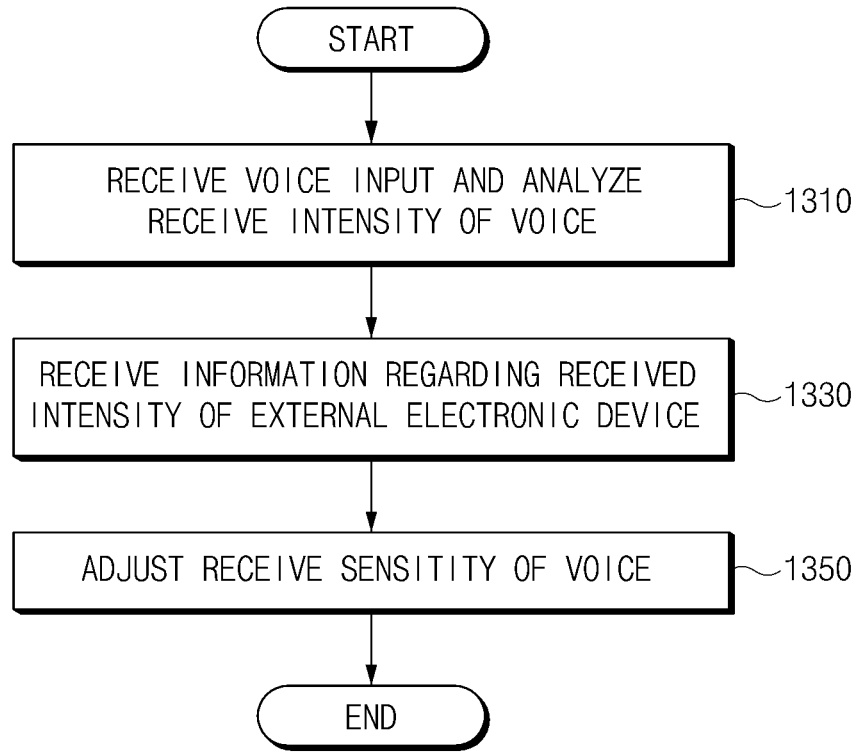
FIG. 13 is a flowchart illustrating an operation method of an electronic device for adjusting the received sensitivity of a voice input according to an embodiment.

FIG. 13 is a flowchart illustrating an operation method of an electronic device for adjusting the received sensitivity of a voice input according to an embodiment.

Referring to FIG. 13, in operation 1310, an electronic device (e.g., an electronic device 100 or a processor 110 of FIG. 1) may receive a voice input of a user through a microphone (e.g., a microphone 120 of FIG. 1) and may analyze the received intensity of the voice input. Further, in operation 1330, the electronic device (e.g., the electronic device 100 or the processor 110) may receive information regarding the received intensity of a voice input from the external electronic device via a communication circuitry (e.g., a communication circuitry 160 of FIG. 1).

In operation 1350, the electronic device (e.g., the electronic device 100 or the processor 110) may adjust the received sensitivity of the voice input based on the received voice input and the information received from the external electronic device. According to an embodiment, in doing so, the electronic device may adjust the threshold of received intensity of a voice input. For example, if the received intensity of a voice input received by the electronic device is a first level and if received intensity of a voice received by the external electronic device is a second level, the electronic device may adjust the threshold to a value between the first level and the second level. The electronic device (e.g., the electronic device 100 or the processor 110) may perform voice recognition depending on whether the intensity of the received voice input exceeds the threshold.

Figure 14:
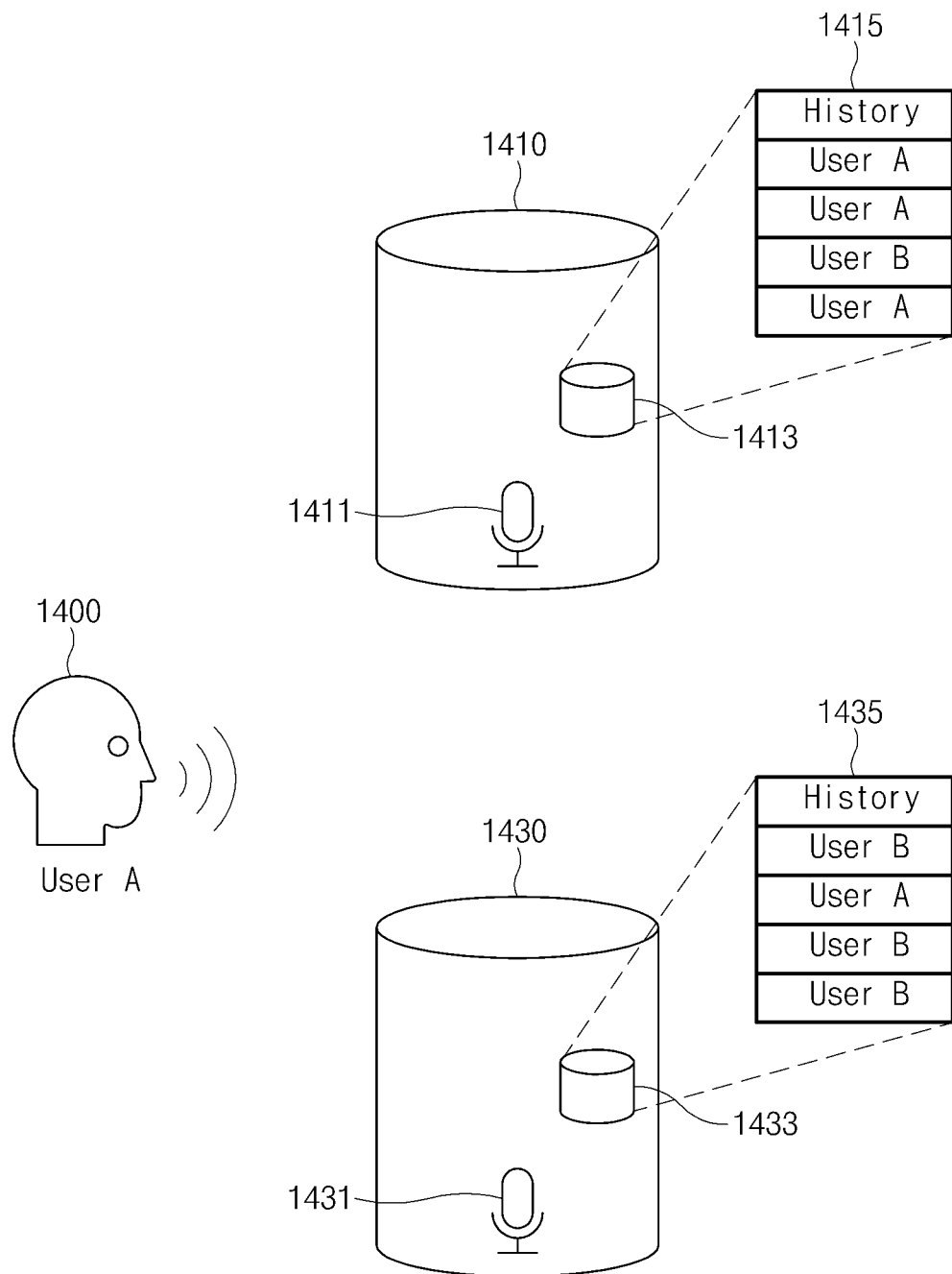
FIG. 14 is a drawing illustrating a method for determining whether to wake up an electronic device based on usage history information according to an embodiment.

FIG. 14 is a drawing illustrating a method for determining whether to wake up an electronic device based on usage history information according to an embodiment.

Referring to FIG. 14, an electronic device (e.g., a first electronic device 1410 or a second electronic device 1430) may determine whether to wake up the electronic device based on usage history information of user A 1400. According to an embodiment, the electronic device (e.g., the first electronic device 1410 or the second electronic device 1430) may perform voiceprint identification for a voice input received through a microphone (e.g., a first microphone 1411 or a second microphone 1431) to identify user A 1400. Further, the electronic device may verify history where the identified user A 1400 uses the electronic device based on usage history information (e.g., first usage history information 1415 or second usage history information 1435) stored in a database (e.g., a first database 1413 or a second database 1433) and may determine whether to wake up the electronic device based on the usage history information. The usage history information may include, for example, information associated with the frequency of use by user A 1400, the number of use by user A 1400, the difference in the frequency of user/the number of use with another user, etc. For another example, the usage history information may include information about the number of times where user A 1400 selects that specific electronic device when two or more electronic devices (e.g., the first electronic device 1410 or the second electronic device 1430) use the specified word (e.g., a wake-up word) to wake up.

As shown in the drawing, if user A 1400 speaks a voice input, only the first electronic device 1410, which is frequently or recently used by user A 1400, may be woken up. The second electronic device 1430, which is frequently or recently used by user B, may not wake up. For example, in a state where the first electronic device 1410 and the second electronic device 1430 are located within a specified distance (e.g., about 20 m), if user A 1400 is located between the first electronic device 1410 and the second electronic device 1430 and speaks a voice input including a specified word, the first electronic device 1410 and the second electronic device 1430 may receive the voice input with the same voice intensity at substantially and almost the same time. In this case, the first electronic device 1410 and the second electronic device 1430 may verify usage history information of user A 1400 to determine whether user A 1400 is a user who frequently use the first electronic device 1410 or the second electronic device 1430. If determining that user A 1400 is the user who frequently use the first electronic device 1410, the first electronic device 1410 may wake up.

Figure 15:
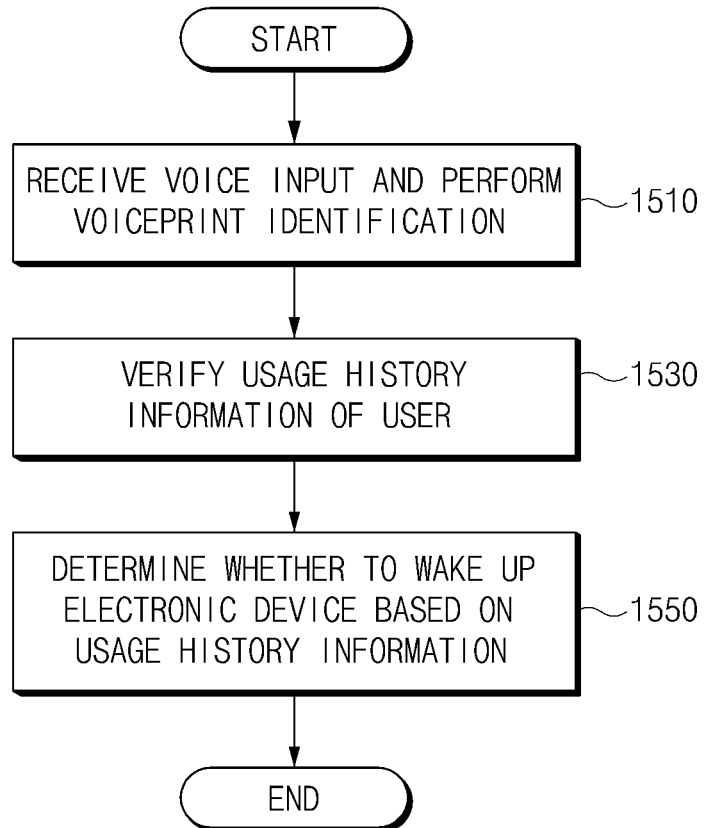
FIG. 15 is a flowchart illustrating an operation method of an electronic device for determining whether to wake up an electronic device based on usage history information according to an embodiment.

FIG. 15 is a flowchart illustrating an operation method of an electronic device for determining whether to wake up an electronic device based on usage history information according to an embodiment.

Referring to FIG. 15, in operation 1510, an electronic device (e.g., an electronic device 100 or a processor 110 of FIG. 1) may receive a voice input of a user through a microphone (e.g., the microphone 120 of FIG. 1) and may perform voice identification for the received voice. According to an embodiment, the electronic device (e.g., the electronic device 100 or the processor 110) may analyze voice data corresponding to the received voice input and may convert the voice data into text. For example, the processor 110 may convert vibration energy of the voice input an electric signal, may convert the electric signal into frequency spectrum information. The electronic device may then compare the converted frequency spectrum information with a plurality of frequency spectrum information corresponding to different voiceprints of different users, thus identifying the user.

In operation 1530, the electronic device may verify usage history information of the user. According to an embodiment, the usage history information of the user may be managed through a database (e.g., the database 615 of FIG. 6). The usage history information of the user may include, for example, information associated with the frequency of use by the user, the number of use by the user, the difference in the frequency of use/the number of use with another user, etc. The usage history information may also include information on the number of times the user has selected a particular device.

In operation 1550, the electronic device (e.g., the electronic device 100 or the processor 110) may determine whether to wake up the electronic device based on the usage history information. For example, if the number of times that the user has used the electronic device is larger than the number of times that another user has used the electronic device, or if the user more recently uses the electronic device than another user, the electronic device may be woken up.

Figure 16:
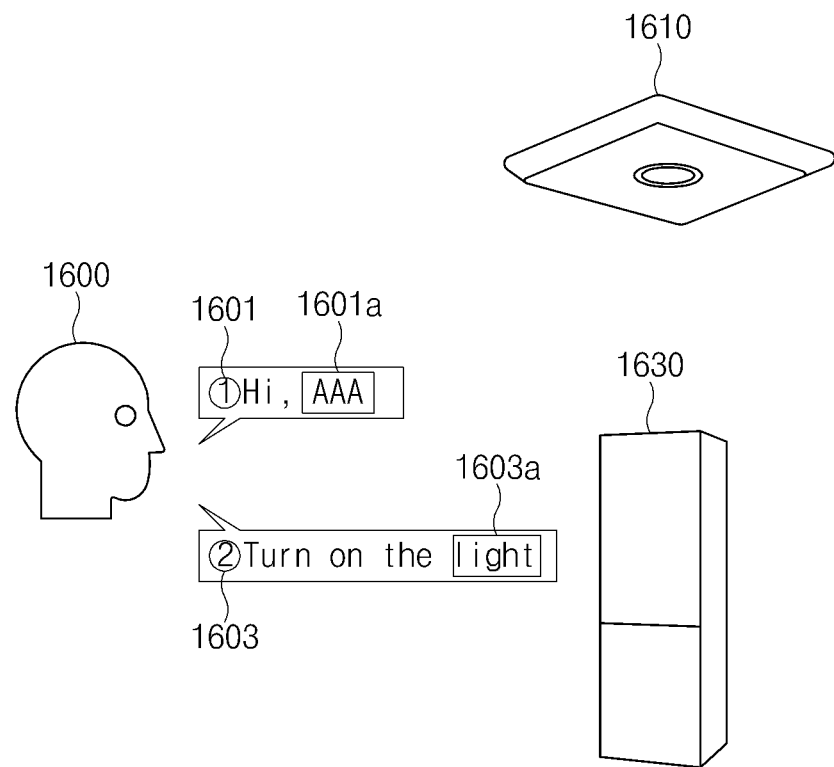
FIG. 16 is a drawing illustrating a method for determining whether to wake up an electronic device based on a performable function according to an embodiment.

FIG. 16 is a drawing illustrating a method for determining whether to wake up an electronic device based on a performable function according to an embodiment.

Referring to FIG. 16, an electronic device (e.g., a first electronic device 1610 or a second electronic device 1630) may receive a voice input of a user 1600 through its microphone and may perform voice recognition for the received voice. Further, the electronic device may determine wake-up of the electronic device based on an instruction included in the voice input that corresponds to a function performable by the electronic device. For example, the electronic device may be woken up only if it is possible for the electronic device to perform the included function.

According to an embodiment, in operation 1601, although a plurality of electronic devices (e.g., the first electronic device 1610 and the second electronic device 1630) recognize a specified word 1601a included in a first voice of the user 1600, only one electronic device (e.g., the first electronic device 1610) may respond to the specified word 1601a and the other electronic device (e.g., the second electronic device 1630) may not wake up. This is because in operation 1603, the first electronic device 1610 determines that it may perform the specified operation 1603a but the second electronic device 1630 determines that it cannot perform the operation 1603a. If there are a plurality of electronic devices capable of performing the same function, the electronic device that is closer to the user may be designated to perform the function.

As shown in the example of FIG. 16, as the user 1600 speaks "Turn on the light," only the first electronic device 1610 (e.g., a light) is woken up to perform the function and the second electronic device 1630 (e.g., a refrigerator) is not woken up. In some embodiments, the first electronic device 1610 and the second electronic device 1630 may be connected to hub devices, respectively. For example, the first electronic device 1610 may be connected to a first hub device, and the second electronic device 1630 may be connected to a second hub device. In this case, the first and second electronic devices 1610 and 1630 may be controlled by the first and second hub devices, respectively. The first and second hub devices may receive a voice input spoken from the user 1600 and may analyze the received voice input. The first and second hub devices then control the first and second electronic devices 1610 and 1630 based on the analyzed result.

Figure 17:
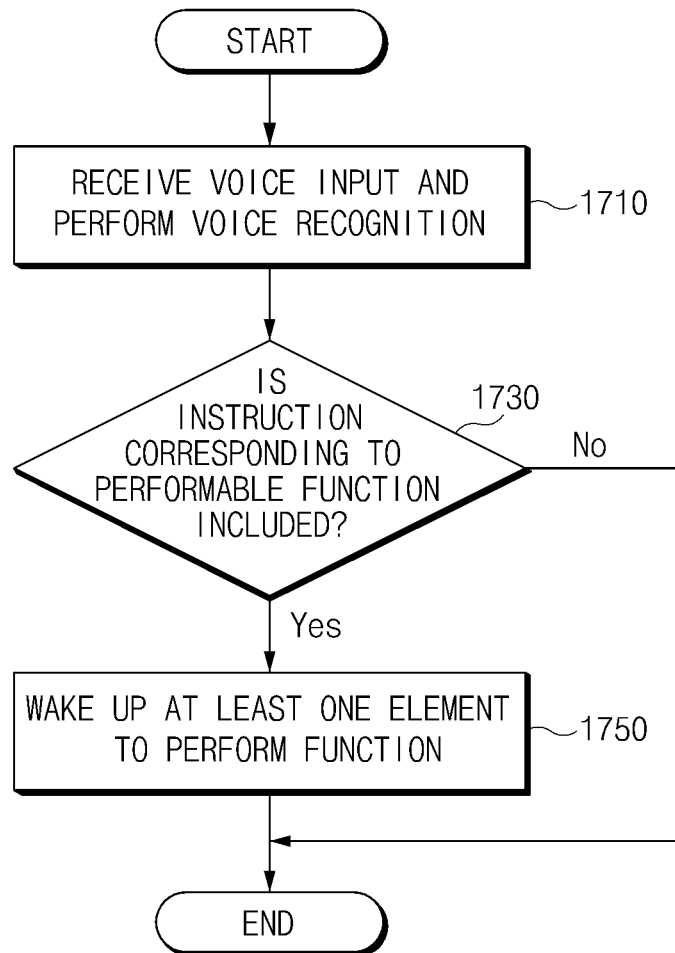
FIG. 17 is a flowchart illustrating a method for determining whether to wake up an electronic device based on a performable function according to an embodiment.

FIG. 17 is a flowchart illustrating a method for determining whether to wake up an electronic device based on a performable function according to an embodiment.

Referring to FIG. 17, in operation 1710, an electronic device (e.g., an electronic device 100 or a processor 110 of FIG. 1) may receive a voice input of a user and may perform voice recognition for the received voice input.

In operation 1730, the electronic device (e.g., the electronic device 100 or the processor) may determine whether an instruction corresponding to a function performable by the electronic device is included in the result of performing the voice recognition.

If the instruction corresponding to the function is included, in operation 1750, the electronic device (e.g., the electronic device 100 or the processor) may wake up at least one element necessary for performing the function. If the instruction corresponds to a function that cannot be performed by the electronic device, the electronic device may not wake up.

According to an embodiment, if there are a plurality of electronic devices capable of performing the function, an electronic device for performing the function may be selected based on the location of the user, the distance between the user and each electronic device, or the like.

As described above, according to one embodiment, a voice input processing method of an electronic device may include receiving a first voice input through a microphone, performing a first voice recognition for the first voice input, if a first specified word for waking up the electronic device is included in a result of the first voice recognition, displaying an indication through the indicator, receiving a second voice input through the microphone, performing a second voice recognition for the second voice input, and if a second specified word corresponding to the indication is included in a result of the second voice recognition, waking up the electronic device.

According to one embodiment, the method may further include verifying mapping information that maps a type of at least one indication to an assignment state of the at least one indication which are stored in a memory of the electronic device, and determining the indication based on the mapping information.

According to one embodiment, the method may further include transmitting information about an another indication different from the indication to the external electronic device if a signal corresponding to the first specified word is received from an external electronic device located near the electronic device.

According to one embodiment, the method may further include adjusting a threshold of a volume level for the second voice recognition based on a first volume level of the first voice input received in the external electronic device included in the signal and a second volume level of the first voice input received through the microphone.

According to one embodiment, the method may further include determining at least one of whether a body part of a user is close to the electronic device and whether the body part of the user is in contact with the electronic device, based on sensing information obtained through a sensor module of the electronic device, and determining whether to wake up the microphone based on the determination that the body part of the user is close to the electronic device or the determination that the body part of the user is in contact with the electronic device.

According to one embodiment, the method may further include performing voiceprint identification for the first voice input to identify a user, and determining whether to wake up the electronic device based on usage history information of the user, the usage history information being stored in a memory of the electronic device.

According to one embodiment, the method may further include determining whether to wake up the electronic device based on whether an instruction corresponding to a function performable by the electronic device is included in the result of the second voice recognition.

Figure 18:
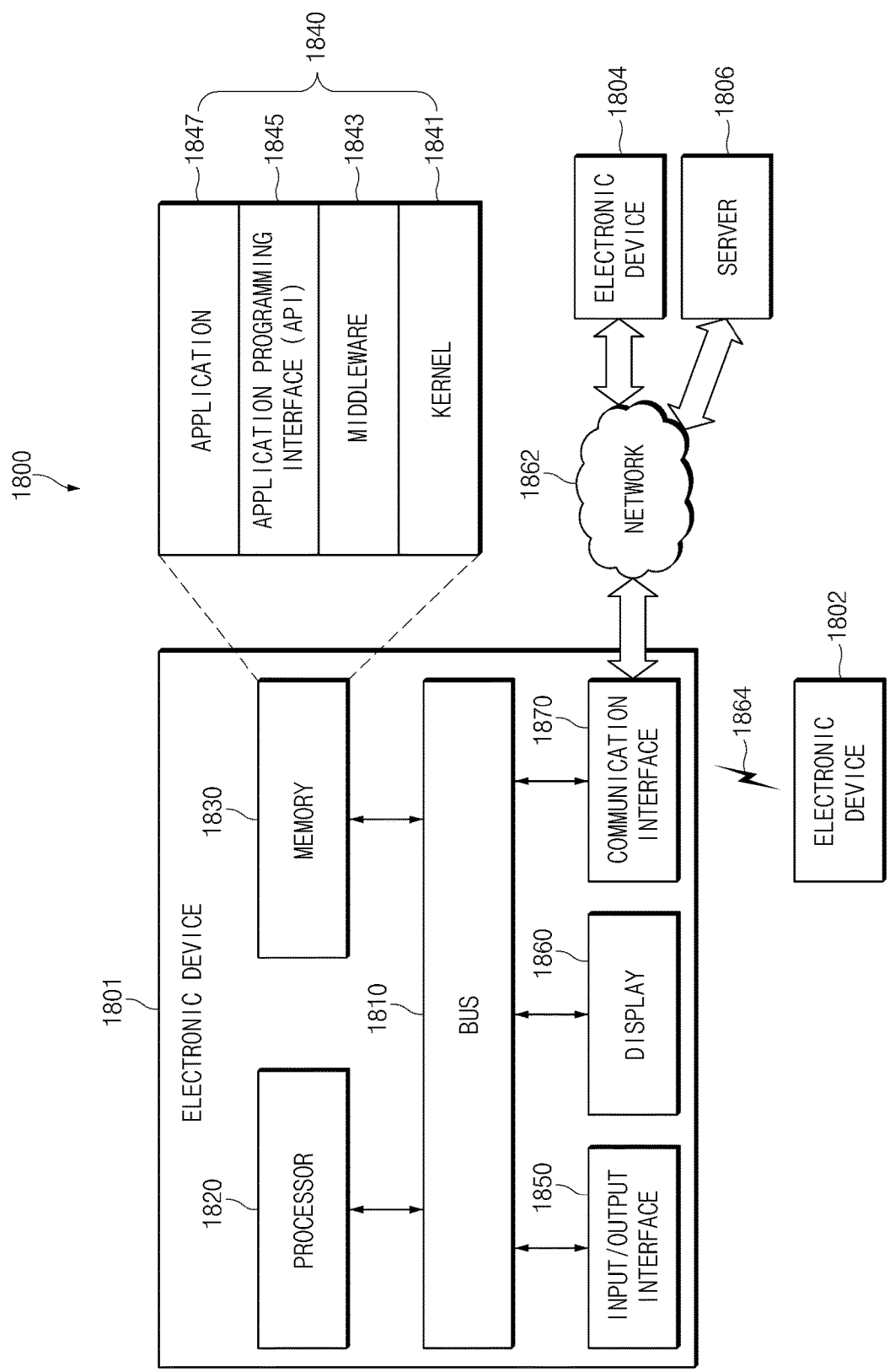
FIG. 18 is a block diagram illustrating an electronic device 1801 in a network environment 1800 according to an embodiment.

FIG. 18 is a block diagram illustrating an electronic device 1801 in a network environment 1800 according to an embodiment. The electronic device 1801 shown in FIG. 18 may be the same or similar structure to an electronic device 100 shown in FIG. 1.

Referring to FIG. 18, an electronic device 1801 may include a bus 1810, a processor 1820, a memory 1830, an input/output interface 1850, a display 1860, and a communication interface 1870. According to an embodiment, the electronic device 1801 may not include at least one of the elements or may further include other element(s). The bus 1810 may interconnect the elements 1820 to 1870 and may include a circuit for conveying communications (e.g., a control message or data) among the elements.

The processor 1820 (e.g., a processor 110 of FIG. 1) may include one or more of a central processing unit (CPU), an application processor (AP), or a communication processor (CP). For example, the processor 1820 may perform an arithmetic operation or data processing associated with control and/or communication of at least one other elements of the electronic device 1801.

The memory 1830 (e.g., a memory 150 of FIG. 1) may include a volatile and/or nonvolatile memory. For example, the memory 1830 may store instructions or data associated with at least one other element(s) of the electronic device 1801. According to an embodiment, the memory 1830 may store software and/or a program 1840. The program 1840 may include, for example, a kernel 1841, a middleware 1843, an application programming interface (API) 1845, and/or an application program (or "an application") 1847. At least a part of the kernel 1841, the middleware 1843, or the API 1845 may be referred to as an "operating system (OS)".

For example, the kernel 1841 may control or manage system resources (e.g., the bus 1810, the processor 1820, the memory 1830, and the like) that are used to execute operations or functions implemented in other programs (e.g., the middleware 1843, the API 1845, and the application program 1847). Furthermore, the kernel 1841 may provide an interface that allows the middleware 1843, the API 1845, or the application program 1847 to access discrete elements of the electronic device 1801 so as to control or manage system resources.

The middleware 1843 may perform, for example, a mediation role such that the API 1845 or the application program 1847 communicates with the kernel 1841 to exchange data. Furthermore, the middleware 1843 may process one or more task requests received from the application program 1847 according to a priority. For example, the middleware 1843 may assign the priority, which makes it possible to use a system resource (e.g., the bus 1810, the processor 1820, the memory 1830, or the like) of the electronic device 1801, to at least one of the application program 1847 and may process the one or more task requests.

The API 1845 may be, for example, an interface through which the application program 1847 controls a function provided by the kernel 1841 or the middleware 1843, and may include, for example, at least one interface or function (e.g., an instruction) for a file control, a window control, image processing, a character control, or the like.

The input/output interface 1850 (e.g., a microphone 120, a speaker 130, or an indicator 140 of FIG. 1) may transmit, for example, an instruction or data, input from a user or another external device, to other element(s) of the electronic device 1801 or may output an instruction or data, received from other element(s) of the electronic device 1801, to a user or another external device.

The display 1860 may include, for example, a liquid crystal display (LCD), a light-emitting diode (LED) display, an organic LED (OLED) display, a microelectromechanical systems (MEMS) display, or an electronic paper display. The display 1860 may display, for example, various contents (e.g., a text, an image, a video, an icon, a symbol, and the like) to a user. The display 1860 may include a touch screen and may receive, for example, a touch, gesture, proximity, or hovering input using an electronic pen or a part of a user's body.

For example, the communication interface 1870 (e.g., a communication circuitry 160 of FIG. 1) may establish communication between the electronic device 1801 and an external device (e.g., the first electronic device 1802, the second electronic device 1804, or the server 1806). For example, the communication interface 1870 may be connected to the network 1862 over wireless communication or wired communication to communicate with the external device (e.g., the second electronic device 1804 or the server 1806).

The wireless communication may include, for example, cellular communication which uses at least one of long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like. According to an embodiment, the wireless communication may be, for example, an element 1864 of FIG. 18. As shown, the wireless communication may include at least one of wireless fidelity (Wi-Fi), light fidelity (Li-Fi), Bluetooth, Bluetooth low energy (BLE), ZigBee, near field communication (NFC), magnetic secure transmission (MST), radio frequency (RF), or a body area network (BAN). According to an embodiment, the wireless communication may include a global navigation satellite system (GNSS). The GNSS may be, for example, a global positioning system (GPS), a global navigation satellite system (Glonass), a Beidou navigation satellite system (hereinafter referred to as "Beidou"), or an European global satellite-based navigation system (hereinafter referred to as "Galileo"). Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 1862 may include at least one of telecommunications networks, for example, a computer network (e.g., LAN or WAN), an Internet, or a telephone network.

Each of the first and second electronic devices 1802 and 1804 may be a device of which the type is different from or the same as that of the electronic device 1801. According to various embodiments, all or a portion of operations that the electronic device 1801 will perform may be executed by another or plural electronic devices (e.g., the first electronic device 1802, the second electronic device 1804 or the server 1806). According to an embodiment, in the case where the electronic device 1801 executes any function or service automatically or in response to a request, the electronic device 1801 may not perform the function or the service internally, but, alternatively or additionally, it may request at least a portion of a function associated with the electronic device 1801 at other electronic device (e.g., the electronic device 1802 or 1804 or the server 1806). The other electronic device may execute the requested function or additional function and may transmit the execution result to the electronic device 1801. The electronic device 1801 may provide the requested function or service using the received result or may additionally process the received result to provide the requested function or service. To this end, for example, cloud computing, distributed computing, or client-server computing may be used.

Figure 19:
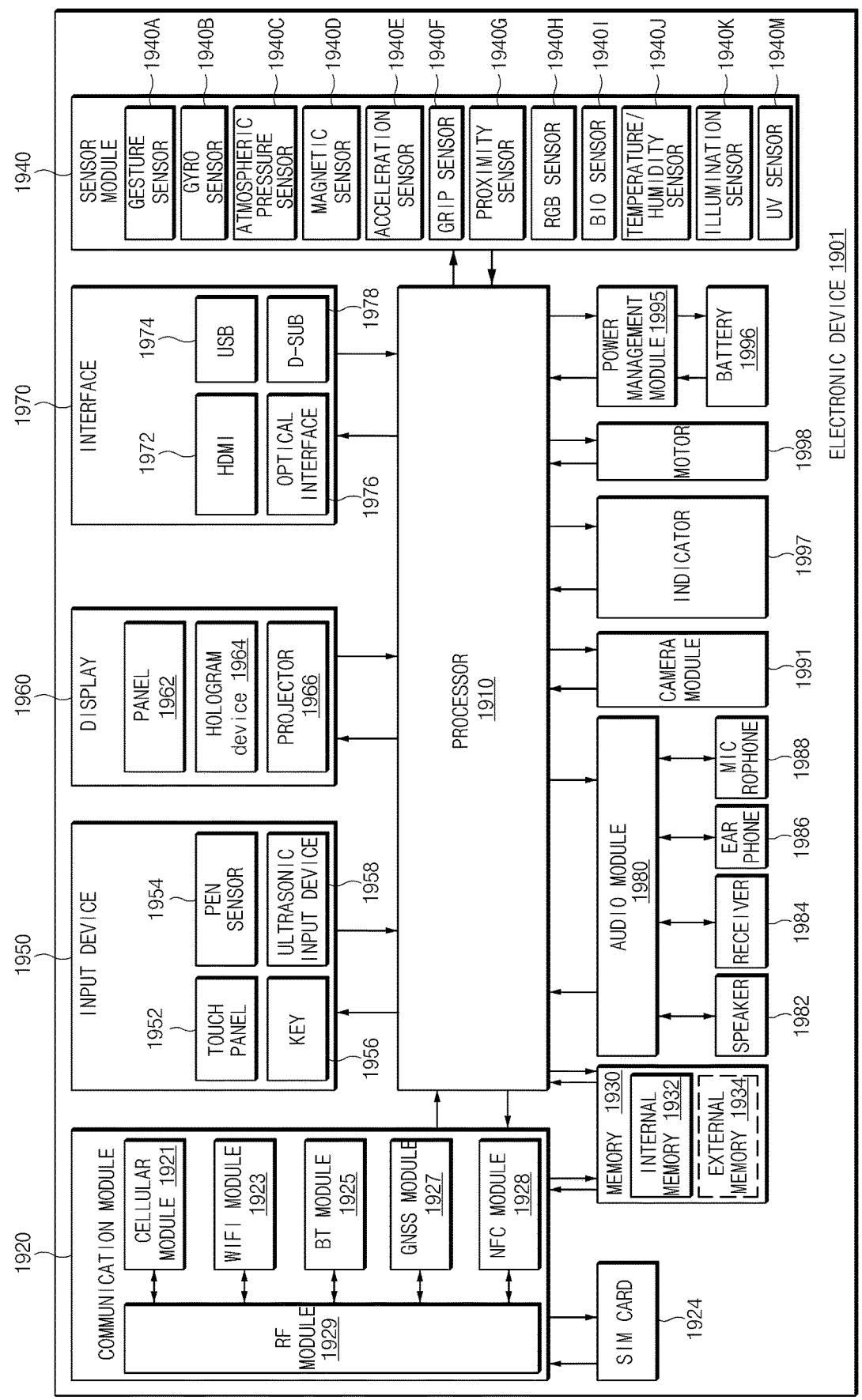
FIG. 19 is a block diagram illustrating an electronic device 1901 according to one embodiment.

FIG. 19 is a block diagram illustrating an electronic device 1901 according to one embodiment.

Referring to FIG. 19, an electronic device 1901 may include, for example, all or a part of the electronic device 100 illustrated in FIG. 1 or the electronic device 1801 illustrated in FIG. 18. The electronic device 1901 may include one or more processors (e.g., an application processor (AP)) 1910, a communication module 1920, a subscriber identification module 1924, a memory 1930, a sensor module 1940, an input device 1950, a display 1960, an interface 1970, an audio module 1980, a camera module 1991, a power management module 1995, a battery 1096, an indicator 1997, and a motor 1998.

The processor 1910 may drive, for example, an operating system (OS) or an application to control a plurality of hardware or software elements connected to the processor 1910 and may process and compute a variety of data. For example, the processor 1910 may be implemented with a System on Chip (SoC). According to an embodiment, the processor 1910 may further include a graphic processing unit (GPU) and/or an image signal processor. The processor 1910 may include at least a part (e.g., a cellular module 1921) of the elements illustrated in FIG. 19. The processor 1910 may load an instruction or data, which is received from at least one of other elements (e.g., a nonvolatile memory), into a volatile memory and process the loaded instruction or data. The processor 1910 may store result data in the nonvolatile memory.

The communication module 1920 may be configured the same as or similar to the communication interface 1870 of FIG. 18. The communication module 1920 may include the cellular module 1921, a Wi-Fi module 1923, a Bluetooth (BT) module 1925, a GNSS module 1927, a near field communication (NFC) module 1928, and a radio frequency (RF) module 1929.

The cellular module 1921 may provide, for example, voice communication, video communication, a character service, an Internet service, or the like over a communication network. According to an embodiment, the cellular module 1921 may perform discrimination and authentication of the electronic device 1901 within a communication network by using the subscriber identification module (e.g., a SIM card) 1924. According to an embodiment, the cellular module 1921 may perform at least a portion of functions that the processor 1910 provides. According to an embodiment, the cellular module 1921 may include a communication processor (CP). In some embodiments, at least some (e.g., two or more) of the cellular module 1921, the Wi-Fi module 1923, the BT module 1925, the GNSS module 1927, or the NFC module 1928 may be included within one Integrated Circuit (IC) or an IC package.

For example, the RF module 1929 may transmit and receive a communication signal (e.g., an RF signal). For example, the RF module 1929 may include a transceiver, a power amplifier module (PAM), a frequency filter, a low noise amplifier (LNA), an antenna, or the like. According to another embodiment, at least one of the cellular module 1921, the Wi-Fi module 1923, the BT module 1925, the GNSS module 1927, or the NFC module 1928 may transmit and receive an RF signal through a separate RF module.

The subscriber identification module 1924 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 1930 (e.g., the memory 1830 of FIG. 18) may include an internal memory 1932 or an external memory 1934. For example, the internal memory 1932 may include at least one of, for example, a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory, a hard drive, or a solid state drive (SSD)). The external memory 1934 may include a flash drive such as compact flash (CF), secure digital (SD), micro secure digital (Micro-SD), mini secure digital (Mini-SD), extreme digital (xD), a multimedia card (MMC), a memory stick, or the like. The external memory 1934 may be operatively and/or physically connected to the electronic device 1901 through various interfaces.

The sensor module 1940 may measure, for example, a physical quantity or may detect an operation state of the electronic device 1901. The sensor module 1940 may convert the measured or detected information to an electric signal. For example, the sensor module 1940 may include at least one of a gesture sensor 1940A, a gyro sensor 1940B, a barometric pressure sensor 1940C, a magnetic sensor 1940D, an acceleration sensor 1940E, a grip sensor 1940F, the proximity sensor 1940G, a color sensor 1940H (e.g., red, green, blue (RGB) sensor), a biometric sensor 1940I, a temperature/humidity sensor 1940J, an illuminance sensor 1940K, or an UV sensor 1940M. Although not illustrated, additionally or alternatively, the sensor module 1940 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1940 may further include a control circuit for controlling at least one or more sensors included therein. According to an embodiment, the electronic device 1901 may further include a processor that is a part of the processor 1910 or independent of the processor 1910 and is configured to control the sensor module 1940. The processor may control the sensor module 1940 while the processor 1910 remains at a sleep state.

The input device 1950 may include, for example, a touch panel 1952, a (digital) pen sensor 1954, a key 1956, or an ultrasonic input unit 1958. For example, the touch panel 1952 may use at least one of capacitive, resistive, infrared and ultrasonic detecting methods. Also, the touch panel 1952 may further include a control circuit. The touch panel 1952 may further include a tactile layer to provide a tactile reaction to a user. The (digital) pen sensor 1954 may be, for example, a part of a touch panel or may include an additional sheet for recognition. The key 1956 may include, for example, a physical button, an optical key, or a keypad. The ultrasonic input device 1958 may detect (or sense) an ultrasonic signal, which is generated from an input device, through a microphone (e.g., a microphone 1988) and may check data corresponding to the detected ultrasonic signal.

The display 1960 (e.g., a display 1860 of FIG. 18) may include a panel 1962, a hologram device 1964, a projector 1966, and/or a control circuit for controlling the panel 1962, the hologram device 1964, or the projector 1966. The panel 1962 may be implemented, for example, to be flexible, transparent or wearable. The panel 1962 and the touch panel 1952 may be integrated into a single module. According to an embodiment, the panel 1962 may include a pressure sensor (or force sensor) that measures the intensity of touch pressure by a user. The pressure sensor may be implemented integrally with the touch panel 1952, or may be implemented as at least one sensor separately from the touch panel 1952. The hologram device 1964 may display a stereoscopic image in a space using a light interference phenomenon. The projector 1966 may project light onto a screen so as to display an image. For example, the screen may be arranged in the inside or the outside of the electronic device 1901.

The interface 1970 may include, for example, a high-definition multimedia interface (HDMI) 1972, a universal serial bus (USB) 1974, an optical interface 1976, or a D-subminiature (D-sub) 1978. The interface 1970 may be included, for example, in a communication interface 1870 illustrated in FIG. 18. Additionally or generally, the interface 1970 may include, for example, a mobile high definition link (MHL) interface, a SD card/multi-media card (MMC) interface, or an infrared data association (IrDA) standard interface.

The audio module 1980 may convert, for example, a sound and an electric signal in dual directions. At least a part of the audio module 1980 may be included, for example, in an input/output interface 1850 illustrated in FIG. 18. The audio module 1980 may process, for example, sound information that is input or output through a speaker 1982, a receiver 1984, an earphone 1986, or the microphone 1988.

For example, the camera module 1991 may capture a still image or a video. According to an embodiment, the camera module 1991 may include at least one or more image sensors (e.g., a front sensor or a rear sensor), a lens, an image signal processor (ISP), or a flash (e.g., an LED or a xenon lamp).

The power management module 1995 may manage, for example, power of the electronic device 1901. According to an embodiment, a power management integrated circuit (PMIC), a charger IC, or a battery or fuel gauge may be included in the power management module 1995. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 1996 and a voltage, current or temperature thereof while the battery is charged. The battery 1996 may include, for example, a rechargeable battery and/or a solar battery.

The indicator 1997 may display a specific state of the electronic device 1901 or a part thereof (e.g., the processor 1910), such as a booting state, a message state, a charging state, and the like. The motor 1998 may convert an electrical signal into a mechanical vibration and may generate the following effects: vibration, haptic, and the like.

The electronic device 1901 may include, for example, a mobile TV supporting device (e.g., a GPU) capable of processing media data according to the standards of digital multimedia broadcasting (DMB), digital video broadcasting (DVB), MediaFLO™, or the like. Each of the above-mentioned elements of the electronic device according to various embodiments of the present disclosure may be configured with one or more components, and the names of the elements may be changed according to the type of the electronic device. In various embodiments, the electronic device (e.g., the electronic device 1901) may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 20:
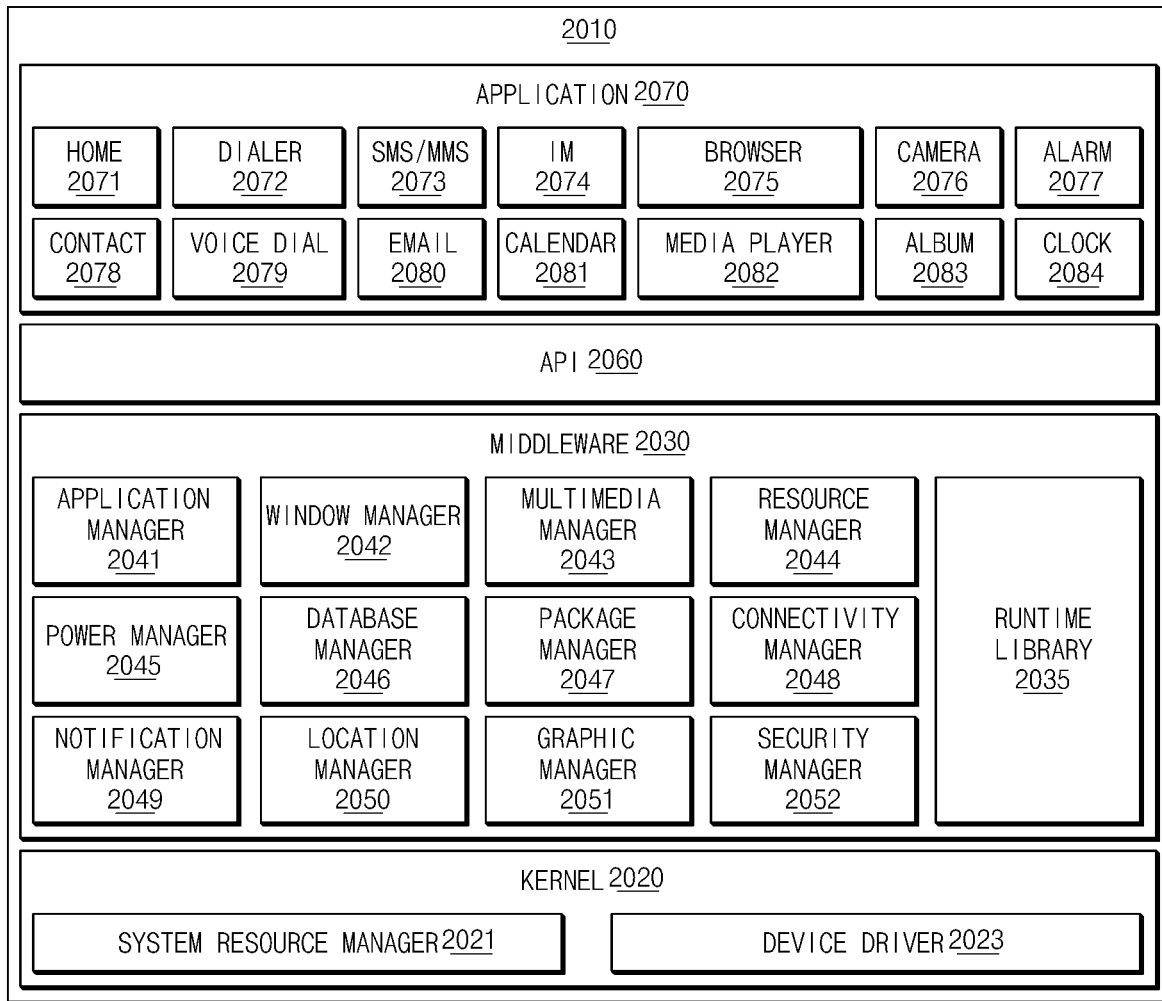
FIG. 20 is a block diagram illustrating a program module 2010 according to an embodiment.

FIG. 20 is a block diagram illustrating a program module 2010 according to an embodiment.

According to an embodiment, a program module 2010 (e.g., a program 1840 of FIG. 18) may include an operating system (OS) to control resources associated with an electronic device (e.g., an electronic device 1801 of FIG. 18), and/or diverse applications (e.g., an application program 1847 of FIG. 18) driven on the OS. The OS may be, for example, Android™, iOS™, Windows™, Symbian™, Tizen™, or Bada™.

Referring to FIG. 20, the program module 2010 may include a kernel 2020 (e.g., a kernel 1841 of FIG. 18), a middleware 2030 (e.g., a middleware 1843 of FIG. 18), an application programming interface (API) 2060 (e.g., an API 1845 of FIG. 18), and/or an application 2070 (e.g., an application program 1847 of FIG. 18). At least a portion of the program module 2010 may be preloaded on an electronic device or may be downloadable from an external electronic device (e.g., a first electronic device 1802, a second electronic device 1804, a server 1806, or the like of FIG. 18).

The kernel 2020 may include, for example, a system resource manager 2021 or a device driver 2023. The system resource manager 2021 may control, allocate, or retrieve system resources. According to an embodiment, the system resource manager 2021 may include a process managing unit, a memory managing unit, a file system managing unit, or the like. The device driver 2023 may include, for example, a display driver, a camera driver, a Bluetooth driver, a shared memory driver, a USB driver, a keypad driver, a Wi-Fi driver, an audio driver, or an inter-process communication (IPC) driver.

The middleware 2030 may provide, for example, a function that the application 2070 needs in common, or may provide diverse functions to the application 2070 through the API 2060 to allow the application 2070 to efficiently use limited system resources of the electronic device. According to an embodiment, the middleware 2030 may include at least one of a runtime library 2035, an application manager 2041, a window manager 2042, a multimedia manager 2043, a resource manager 2044, a power manager 2045, a database manager 2046, a package manager 2047, a connectivity manager 2048, a notification manager 2049, a location manager 2050, a graphic manager 2051, or a security manager 2052.

The runtime library 2035 may include, for example, a library module that is used by a compiler to add a new function through a programming language while the application 2070 is being executed. The runtime library 2035 may perform input/output management, memory management, or capacities about arithmetic functions.

The application manager 2041 may manage, for example, a life cycle of at least one application of the application 2070. The window manager 2042 may manage a graphic user interface (GUI) resource that is used in a screen. The multimedia manager 2043 may identify a format necessary for playing diverse media files, and may perform encoding or decoding of media files by using a codec suitable for the format. The resource manager 2044 may manage resources such as a storage space, memory, or source code of at least one application of the application 2070.

The power manager 2045 may operate, for example, with a basic input/output system (BIOS) to manage a battery or power, and may provide power information for an operation of an electronic device. The database manager 2046 may generate, search for, or modify database that is to be used in at least one application of the application 2070. The package manager 2047 may install or update an application that is distributed in the form of package file. The connectivity manager 2048 may manage, for example, wireless connection.

The notification manager 2049 may display or notify an event such as arrival message, appointment, or proximity notification in a mode that does not disturb a user. The location manager 2050 may manage location information about an electronic device. The graphic manager 2051 may manage a graphic effect that is provided to a user, or manage a user interface relevant thereto. The security manager 2052 may provide a general security function necessary for system security, user authentication, or the like.

According to an embodiment, the middleware 2030 may include a telephony manager for managing a voice or video call function of the electronic device or a middleware module that combines diverse functions of the above-described elements. According to an embodiment, the middleware 2030 may provide a module specialized to each OS kind to provide differentiated functions. Additionally, the middleware 2030 may dynamically remove a part of the preexisting elements or may add new elements thereto.

The API 2060 may be, for example, a set of programming functions and may be provided with a configuration that is variable depending on an OS. For example, in the case where an OS is the android or the iOS, it may provide one API set per platform. In the case where an OS is the Tizen, it may provide two or more API sets per platform.

The application 2070 may include, for example, applications such as a home 2071, a dialer 2072, an SMS/MMS 2073, an instant message (IM) 2074, a browser 2075, a camera 2076, an alarm 2077, a contact 2078, a voice dial 2079, an e-mail 2080, a calendar 2081, a media player 2082, an album 2083, a watch 2084, health care (e.g., measuring an exercise quantity, blood sugar, or the like) or offering of environment information (e.g., information of barometric pressure, humidity, temperature, or the like).

According to an embodiment, the application 2070 may include an information exchanging application to support information exchange between an electronic device and an external electronic device. The information exchanging application may include, for example, a notification relay application for transmitting specific information to an external electronic device, or a device management application for managing the external electronic device. For example, the notification relay application may include a function of transmitting notification information, which arise from other applications, to an external electronic device or may receive, for example, notification information from an external electronic device and provide the notification information to a user. The device management application may install, delete, or update for example, a function (e.g., turn-on/turn-off of an external electronic device itself (or a part of components) or adjustment of brightness (or resolution) of a display) of the external electronic device which communicates with the electronic device, and an application running in the external electronic device.

According to an embodiment, the application 2070 may include an application (e.g., a health care application of a mobile medical device) that is assigned in accordance with an attribute of an external electronic device. According to an embodiment, the application 2070 may include an application that is received from an external electronic device.

At least a portion of the program module 2010 may be implemented by software, firmware, hardware (e.g., the processor 1910), or a combination (e.g., execution) of two or more thereof, and may include modules, programs, routines, sets of instructions, processes, or the like for performing one or more functions.

The term "module" used herein may represent, for example, a unit including one of hardware, software and firmware or a combination thereof. The term "module" may be interchangeably used with the terms "unit", "logic", "logical block", "component" and "circuit". The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 1820), the processor may perform functions corresponding to the instructions. The computer-readable storage medium may be, for example, the memory 1830.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

Certain aspects of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

What is claimed is:

1. An electronic device, comprising:
    a microphone configured to receive a voice input;
    a communication circuitry configured to communicate with an external electronic device;
    an indicator configured to provide at least one visual indication; and
    a processor configured to be electrically connected with the microphone, the communication circuitry, and the indicator; and
    a memory configured to be electrically connected with the processor,
    wherein the memory stores instructions, when executed, cause the processor to:
        receive a first voice input through the microphone;
        perform a first voice recognition for the first voice input;
        if a first specified word, which is common to a plurality of devices, for waking up the electronic device is included in a result of the first voice recognition, display a first visual indication through the indicator for distinguishing the electronic device among the plurality of devices;
        receive a second voice input through the microphone;
        perform a second voice recognition for the second voice input;
        if a second specified word corresponding to the first visual indication is included in a result of the second voice recognition, wake up the electronic device; and
        if a signal corresponding to the first specified word is received from the external electronic device located near the electronic device, transmit information about a second visual indication different from the first visual indication to the external electronic device.

2. The electronic device of claim 1, wherein the indicator comprises at least one of a light emitting diode (LED) or a display, and
    wherein the first visual indication is at least one color displayed by the indicator.

3. The electronic device of claim 1, wherein the memory further include mapping information that maps a type of the at least one visual indication to an assignment state of the at least one visual indication, and
    wherein the instructions cause the processor to:
        determine the first visual indication based on the mapping information.

4. The electronic device of claim 1, wherein the signal comprises at least one of information regarding when the external electronic device received the first voice input and a first volume level of the first voice input received by the external electronic device.

5. The electronic device of claim 4, wherein the instructions cause the processor to:
    adjust a threshold of a volume level for the second voice recognition based on the first volume level of the first voice input included in the signal and a second volume level of the first voice input received through the microphone.

6. The electronic device of claim 1, further comprising:
    a speaker,
    wherein the instructions cause the processor to:
        output a voice output corresponding to the first visual indication through the speaker.

7. The electronic device of claim 1, further comprising:
    a sensor module,
    wherein the instructions cause the processor to:
        determine at least one of whether a body part of a user is close to the electronic device and whether the body part of the user is in contact with the electronic device, based on sensing information obtained through the sensor module; and
        determine whether to wake up the microphone based on the determination that the body part of the user is close to the electronic device or the determination that the body part of the user is in contact with the electronic device.

8. The electronic device of claim 1, wherein the memory includes usage history information of a user for the electronic device, and
    wherein the instructions cause the processor to:
        perform voiceprint identification for the first voice input to identify the user; and
        determine whether to wake up the electronic device based on the usage history information of the user.

9. The electronic device of claim 1, wherein the instructions cause the processor to:
    determine whether to wake up the electronic device based on whether an instruction corresponding to a function performable by the electronic device is included in the result of the second voice recognition.

10. A voice input processing method of an electronic device, the method comprising:
    receiving a first voice input through a microphone;
    performing a first voice recognition for the first voice input;
    if a first specified word, which is common to a plurality of devices, for waking up the electronic device is included in a result of the first voice recognition, displaying an indication for distinguishing the electronic device among the plurality of devices through the indicator;
    receiving a second voice input through the microphone;
    performing a second voice recognition for the second voice input;

if a second specified word corresponding to the indication is included in a result of the second voice recognition, waking up the electronic device; and if a signal corresponding to the first specified word is received from an external electronic device located near the electronic device, transmitting information about another indication different from the indication to the external electronic device.

11. The method of claim 10, further comprising:

verifying mapping information that maps a type of at least one indication to an assignment state of the at least one indication which are stored in a memory of the electronic device; and determining the indication based on the mapping information.

12. The method of claim 10, further comprising:

adjusting a threshold of a volume level for the second voice recognition based on a first volume level of the first voice input received in the external electronic device included in the signal and a second volume level of the first voice input received through the microphone.

13. The method of claim 10, further comprising:

determining at least one of whether a body part of a user is close to the electronic device and whether the body part of the user is in contact with the electronic device, based on sensing information obtained through a sensor module of the electronic device; and determining whether to wake up the microphone based on the determination that the body part of the user is close to the electronic device or the determination that the body part of the user is in contact with the electronic device.

14. The method of claim 10, further comprising:

performing voiceprint identification for the first voice input to identify a user; and determining whether to wake up the electronic device based on usage history information of the user, the usage history information being stored in a memory of the electronic device.

15. The method of claim 10, further comprising:

determining whether to wake up the electronic device based on whether an instruction corresponding to a function performable by the electronic device is included in the result of the second voice recognition.

* * * * *